(12) United States Patent
Moen et al.

(10) Patent No.: US 7,700,140 B2
(45) Date of Patent: Apr. 20, 2010

(54) BACTERIAL AUTOLYSATE

(75) Inventors: Einar Moen, Stavanger (NO); Henrik Eriksen, Nyborg (DK); Jan Larsen, Tommerup (DK)

(73) Assignee: Statoil ASA, Stavanger (NO)

( * ) Notice: Subject to any disclaimer, the term of this patent is extended or adjusted under 35 U.S.C. 154(b) by 0 days.

(21) Appl. No.: 10/504,463

(22) PCT Filed: Feb. 12, 2003

(86) PCT No.: PCT/GB03/00640

§ 371 (c)(1),
(2), (4) Date: Jun. 17, 2005

(87) PCT Pub. No.: WO03/068003

PCT Pub. Date: Aug. 21, 2003

(65) Prior Publication Data

US 2005/0271771 A1 Dec. 8, 2005

Related U.S. Application Data

(60) Provisional application No. 60/356,767, filed on Feb. 15, 2002.

(30) Foreign Application Priority Data

Feb. 12, 2002 (GB) ................................ 0203307.4

(51) Int. Cl.
*A23K 3/00* (2006.01)
(52) U.S. Cl. ..................................................... 426/53
(58) Field of Classification Search ........................ None
See application file for complete search history.

(56) References Cited

U.S. PATENT DOCUMENTS 4,455,373 A * 6/1984 Higgins ....................... 435/132

FOREIGN PATENT DOCUMENTS

FR 2311091 12/1976
GB 933826 8/1963
WO WO 01/60974 8/2001

OTHER PUBLICATIONS

The term "autolysis" Merriam-Webster Online Dictionary, at the web- http://www.m-w.com, p. 1, Accessed on Feb. 22, 2007.*
Drozd J.W. et al. An in situ assessment of the specific lysis rate in continuous cultures of *Methylococcus* sp. (NCIB 11083) grown on methane, FEMS Microbiology Letters, 1978, 4: 311-314, entire document.*
Larsen et al, *Applied Microbiology and Biotechnology*, 45:137-140 (1996).
Babusenko et al, *Prikladnaya Biokhimiya I Mikrobiologiya*, 28(5):752-759 (1992).
Starostina et al, *Prikladnaya Biokhimiya I Mikrobiologiya*, 27(4):546-553 (1991).
Hanson et al, *Microbiological Reviews*, American Society for Microbiology, 60(2):439-471 (1996).
Starostina et al, *Prikladnaya Biokhimiya I Mikrobiologiya*, 29(4):580-586 (1993).
Chetina et al, *Prikladnaya Biokhimiya I Mikrobiologiya*, 20(5):648-652 (1984).
Gorkina et al, *Biokhimiya*, 59(2):288-295 (1994).
Skrede et al, *Animal Feed Science and Technology*, 76:103-116 (1998).
Øverland et al, *Animal Science*, 51:97-106 (2001).
Linton et al, *J. of General Microbiology*, 101:219-225 (1977).
Middleberg et al, *Biotechnology Advances*, 13(3):491-551 (1995).
Bothe et al, *Appl. Microbiol. Biotechnol.*, 59:33-39 (2002).
Product Brochure issued by Norferm DA, Stavanger, Norway: "BioProtein: A New High Quality Single Cell Protein Based on Natural Gas"—published 1998.

* cited by examiner

*Primary Examiner*—Jon P Weber
*Assistant Examiner*—Satyendra K Singh
(74) *Attorney, Agent, or Firm*—Sughrue Mion, PLLC

(57) ABSTRACT

A method for producing a feedstuff or feedstuff component, e.g., a palatability-enhancing agent, said method comprising subjecting a microbial culture which comprises a methanotrophic bacterium to autolysis.

15 Claims, 14 Drawing Sheets

BACTERIAL AUTOLYSATE

CROSS-REFERENCE TO RELATED APPLICATION

Figure 1:
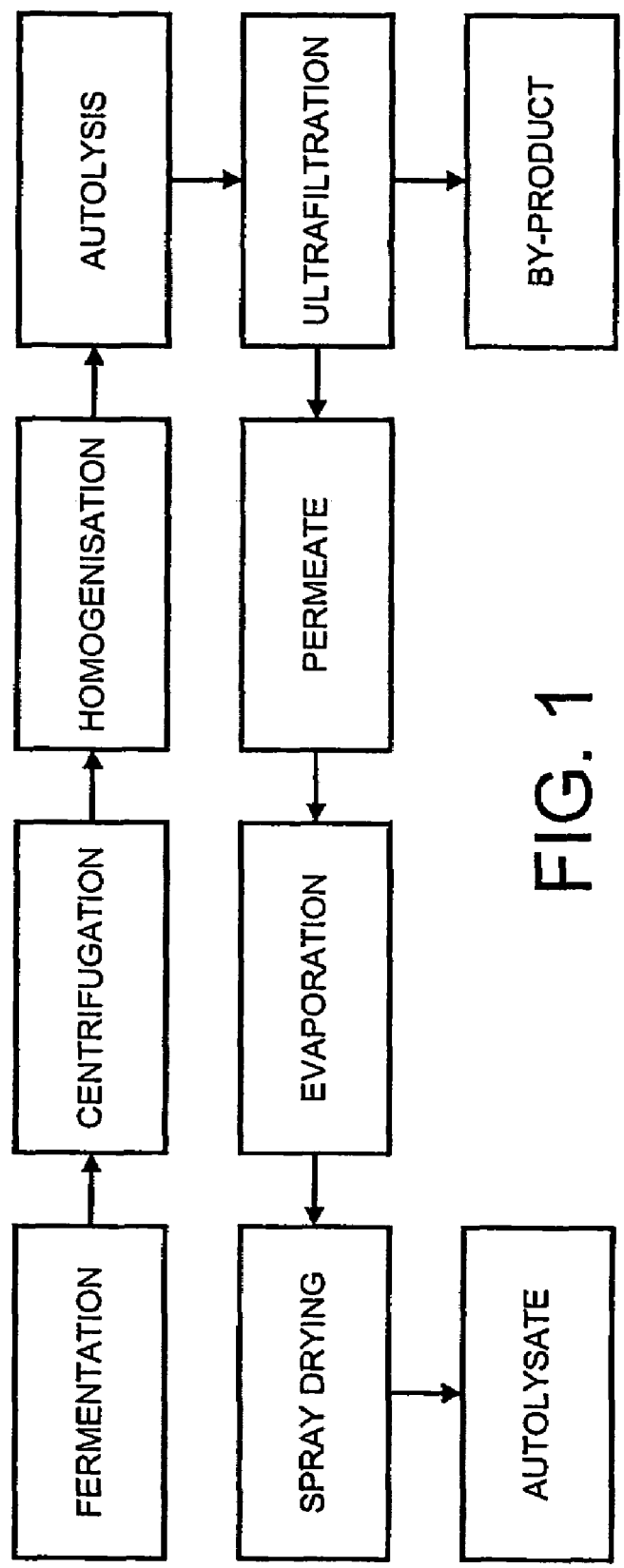

This application is a 371 of PCT/GB03/00640, filed Feb. 12, 2003, and claims benefit under 35 U.S.C. §119 to U.S. Provisional Application No. 60/356,767, filed Feb. 15, 2002; the disclosure of which is incorporated herein by reference.

The present invention relates to a process for the production of a feedstuff or feedstuff component, e.g. a palatability-enhancing agent or nutrient, from a bacterial biomass, in particular from a bacterial culture comprising a methanotrophic bacterium. This product finds particular use as nutrient or as a flavor-enhancing agent in both human and animal foods as a replacement for traditional yeast derivatives.

Recently, much attention has been directed toward the development of new sources of protein which may be incorporated into foods for human and/or animal consumption. A number of different protein-containing materials have been proposed as substitutes for more traditional sources of protein, such as fish meal, soya products and blood plasma, in human foods and as animal feeds. These materials include protein-containing microorganisms (also referred to herein as "single-cell proteins") such as fungi, yeasts and bacteria.

Single-cell protein materials can be used directly in foods, e.g. as a spray dried product, or the biomass may be further processed, e.g. using techniques such as homogenization and/or separation, before use. WO 01/60974, for example, describes the production of a homogenized derivative of a bacterial biomass having excellent functional properties and which may be used in the preparation of various food products, for example as a gelling agent or emulsifier.

Today, the most widely used single-cell proteins are those derived from fungi or yeast. Yeast, for example, is well known for use in the brewing, wine-making and baking industries. Various processed derivatives of yeast are also known for use in the preparation of foodstuffs. For example, autolysis of yeast results in a variety of cellular components known for use as flavourings or seasonings in food products, e.g. in the preparation of sauces, gravies, etc. However, relatively large quantities of yeast autolysates are generally required to obtain the desired taste enhancement effects. Furthermore, autolysis of yeast is generally slow and it can take several days to achieve a suitable degree of digestion. Additives which act as autolysis initiators or stimulators, e.g. thiol agents, are therefore generally required to accelerate the autolysis process. This increases the cost of commercial production of yeast autolysates.

A continuing need exists for alternative materials which are capable of increasing the palatability of human and animal food products, especially materials which can be produced in large quantities and at relatively low cost. A particular need exists for new materials which can act as flavor enhancers.

Surprisingly, we have now found that the autolysis of a methanotrophic bacterium-containing biomass, or a derivative thereof (e.g. a homogenized derivative), has the effect of producing effective palatability-enhancing components, which are also useful as nutrients, i.e. feedstuffs or feed components.

Thus, according to one aspect, the present invention provides a process for producing a feedstuff or feedstuff component, e.g. a palatability-enhancing agent, said method comprising subjecting a methanotrophic-bacterium containing culture, or a derivative thereof (e.g. a homogenized derivative) to autolysis. Autolysed products produced by this process form a further aspect of the invention.

The autolysate produced according to the invention may typically be used as a feedstuff or feedstuff component for fish or shellfish, e.g. as described in PCT/GB02/03795 (a copy of which is filed herewith) the contents of which are incorporated herein by reference. Likewise the autolysate may advantageously be used as a flavor-enhancer for pet food, especially for dog food, for example as described in British Patent Application No. 0203907.1 (a copy of which is filed herewith) the contents of which are also incorporated herein by reference.

The autolysate of the invention is especially preferably used as an ingredient for extruded fish food in pellet form. The fish food pellets will typically also contain protein and lipid, e.g. fish meal and fish and/or plant oil, as well as a small quantity of carbohydrate, e.g. plant derived starch.

As used herein the term "autolysis" is intended to encompass a process in which endogenous enzymes contained within a cell, such as nucleases and proteases, digest the components of the cell. This "self-digestion" process results in the production of various degradation products of the cell which may include peptides, amino acids, nucleotides, phospholipids, fatty acids, etc.

As used herein the term "palatability" includes all properties of a food product which may be sensed by a human or animal. Such properties include not only aroma, but also taste and texture. The term "palatability" is also considered to encompass other properties of a food product, e.g. digestibility. The term "palatability-enhancing agent" is considered to encompass materials which either possess desired palatability properties or which, when present in any food product, are effective to enhance the palatability (e.g. the flavor) of other components of the food.

As used herein the term "derivative" when used in relation to a single-cell protein material, e.g. a microbial culture, includes any product which may be derived from such a material using a downstream processing technique or techniques (e.g. a series of techniques) known in the art, such as separation of a single-cell protein material from a fermentation medium or liquid by centrifugation and/or ultrafiltration methods. A preferred derivative for use in the process herein described is a homogenized derivative of the single-cell protein material in which the cells are disrupted or disintegrated, e.g. as a result of mechanical disruption, whereby to release the contents of the cell. Such homogenized materials will generally consist of a viscous protein slurry containing both soluble and particulate cellular components.

In the process of the invention autolysis will generally be conducted by incubation of the bacterial culture under carefully controlled conditions. Suitable incubation conditions capable of initiating endogenous enzyme activity and which thus yield an autolysed product may be readily determined by those skilled in the art. Autolysis is preferably carried out in the absence of any autolysis initiator or stimulator.

Temperature conditions will be such that autolysis is optimised without inactivating the endogenous enzymes contained within the cells. Typically, the temperature for autolysis will be in the range of from 25 to 58° C., preferably from 40 to 55° C., particularly preferably from 45 to 55° C., especially 50 to 55° C. Temperatures towards the higher end of these ranges are preferred, e.g. about 55° C. If lower temperatures are employed (e.g. 20° C. or lower) autolysis proceeds very slowly. When using the bacterium *Methylococcus Capsulatus* the incubation temperature preferably should not exceed about 58° C. At temperatures in excess of this, inactivation of the endogenous enzymes contained in the cells (e.g. proteases and peptidases) can occur.

A suitable pH range for autolysis may lie in the range of from 6.2 to 8.5, preferably from 7.0 to 8.0, particularly preferably from 7.0 to 7.5. At a pH of below about 5.5 autolysis cannot proceed. A pH of about 7.0 is especially preferred. The nature, quantity and timing of addition of any base required to maintain the pH of the biomass within the desired limits during autolysis may be readily determined by those skilled in the art. Suitable bases for pH regulation include sodium hydroxide, potassium hydroxide, etc.

The autolysed product may be produced in a continuous or batchwise process. Preferably this will be produced continuously. When produced batchwise, the pH of the biomass may decrease rapidly during the initial stages of the reaction, e.g. from 30 minutes up to one hour after the start of the incubation process. This is believed to be due to breakage of the peptide bonds. During this period the amount of base required to maintain the pH within the desired limits may therefore need to be increased. After this time, the amount of base required will generally decrease. pH may be regulated during autolysis using standard methods known in the art. Such methods include continuous monitoring of pH by titration in combination with the appropriate addition of acid/base.

The reaction time for autolysis will typically lie in the range of from 30 minutes to 24 hours, e.g. from 1 to 5 hours. A preferred reaction time is about 4 hours. In general, the yield of autolysed product increases with the reaction time. The incubation period can therefore be selected according to the desired yield of autolysate.

The autolysis process will generally be carried out in a stirred-tank reactor or plug-flow reactor.

The autolysis process herein described may be expected to yield a product which comprises from 40 to 75% by weight, e.g. about 50% by weight, insoluble material (e.g. comprising cell wall fragments, etc.) and from 25 to 60% by weight, e.g. about 50% by weight, soluble material (also referred to herein as the "soluble fraction") which typically will comprise free amino acids (especially glutamic acid), peptides and nucleotides (mainly 3'-nucleotides).

The bacterial biomass for use in the process of the invention may be formed by growth of the bacteria on a suitable medium or substrate. The exact nature of the growth medium used to produce the biomass is not critical to the performance of the invention and a variety of suitable substrates may be used.

Conveniently, the single-cell material for use in the process of the invention may be produced by a fermentation process in which oxygen and a suitable substrate such as a liquid or gaseous hydrocarbon, an alcohol or carbohydrate, e.g. methane, methanol or natural gas, together with a nutrient mineral solution are fed to a tubular reactor containing the microorganism or microorganisms. A number of such processes are known and described in the art, for example in WO 01/60974, DK-B-170824, EP-A-418187 and EP-A-306466. Particularly preferably the biomass which is autolysed according to the invention is produced as described in PCT/GB02/003798 (a copy of which is filed herewith) the contents of which are incorporated herein by reference.

Particularly preferred for use in the invention are single-cell protein materials derived from fermentation on hydrocarbon fractions or on natural gas. Especially preferred are single-cell proteins derived from the fermentation of natural gas. As the concentration of microorganisms increases within the fermentor, a portion of the reactor contents or broth is withdrawn and the microorganisms may be separated by techniques well known in the art, e.g. centrifugation and/or ultrafiltration. Conveniently, in such a fermentation process, the broth will be continuously withdrawn from the fermentor and will have a cell concentration between 1 and 5% by weight, e.g. about 3% by weight.

Single-cell materials produced from two or more microorganisms may be treated in accordance with the process of the invention. Although these may be produced in the same or separate fermentors, generally these will be produced in the same fermentor under identical fermentation conditions. Materials produced from separate fermentation processes may be blended together prior to autolysis in accordance with the process of the invention.

Preferred bacteria for use in the invention include *Methylococcus capsulatus* (Bath), a thermophilic bacterium originally isolated from the hot springs in Bath, England and deposited as NCIMB 11132 at The National Collections of Industrial and Marine Bacteria, Aberdeen, Scotland. *M. capsulatus* (Bath) has optimum growth at about 45° C., although growth can occur between 37° C. and 52° C. It is a gram-negative, non-motile spherical cell, usually occurring in pairs. The intracellular membranes are arranged as bundles of vesicular discs characteristic of Type I methanotrophs. *M. capsulatus* (Bath) is genetically a very stable organism without known plasmids. It can utilize methane or methanol for growth and ammonia, nitrate or molecular nitrogen as a source of nitrogen for protein synthesis.

One example of a fermentation process which uses natural gas as the sole carbon and energy source is that described in EP-A-306466 (Dansk Bioprotein). This process is based on the continuous fermentation of the methanotrophic bacteria *M. capsulatus* grown on methane. Air or pure oxygen is used for oxygenation and ammonia is used as the nitrogen source. In addition to these substrates, the bacterial culture will typically require water, phosphate (e.g. as phosphoric acid) and several minerals which may include magnesium, calcium, potassium, iron, copper, zinc, manganese, nickel, cobalt and molybdenum, typically used as sulphates, chlorides or nitrates. All minerals used in the production of the single-cell material should be of food-grade quality.

Natural gas mainly consists of methane, although its composition will vary for different gas fields. Typically, natural gas may be expected to contain about 90% methane, about 5% ethane, about 2% propane and some higher hydrocarbons. During the fermentation of natural gas, methane is oxidized by methanotrophic bacteria to biomass and carbon dioxide. Methanol, formaldehyde and formic acid are metabolic intermediates. Formaldehyde and to some extent carbon dioxide are assimilated into biomass. However, methanotrophic bacteria are unable to use substrates comprising carbon-carbon bonds for growth and the remaining components of natural gas, i.e. ethane, propane and to some extent higher hydrocarbons, are oxidized by methanotrophic bacteria to produce the corresponding carboxylic acids (e.g. ethane is oxidized to acetic acid). Such products can be inhibitory to methanotrophic bacteria and it is therefore important that their concentrations remain low, preferably below 50 mg/l, during the production of the biomass. One solution to this problem is the combined use of one or more heterotrophic bacteria which are able to utilize the metabolites produced by the methanotrophic bacteria. Such bacteria are also capable of utilizing organic material released to the fermentation broth by cell lysis. This is important in order to avoid foam formation and also serves to minimize the risk of the culture being contaminated with undesirable bacteria. A combination of methanotrophic and heterotrophic bacteria results in a stable and high yielding culture.

Suitable heterotrophic bacteria for use in the invention include DB3, strain NCIMB 13287 (*Ralstonia* sp. formerly known as *Alcaligenes acidovorans*), DB5, strain NCIMB 13289 (*Brevibacillus agri* formerly known as *Bacillus firmus*) and DB4, strain NCIMB 13288 (*Aneurinibacillus* sp. formerly known as *Bacillus brevis*) which each have optimum growth at a temperature of about 45° C.

DB3 is a gram-negative, aerobic, motile rod belonging to the genus *Ralstonia* which can use ethanol, acetate, propionate and butyrate for growth. DB4 is a gram-positive, endospore-forming, aerobic rod belonging to the genus *Aneurinibacillus* which can utilize acetate, D-fructose, D-mannose, ribose and D-tagatose. DB5 is a gram-positive, endospore-forming, motile, aerobic rod of the genus *Brevibacillus* which can utilize acetate, N-acetyl-glucosamine, citrate, gluconate, D-glucose, glycerol and mannitol.

Particularly preferably, the single-cell protein material for use in the invention will be a microbial culture which consists of methanotrophic bacteria optionally in combination with one or more species of heterotrophic bacteria, especially preferably a combination of methanotrophic and heterotrophic bacteria. As used herein, the term "methanotrophic" encompasses any bacterium which utilizes methane, methanol or formaldehyde for growth. The term "heterotrophic" is used for bacteria that utilize organic substrates other than methane, methanol or formaldehyde for growth.

Especially preferred for use in the invention is a microbial culture comprising a combination of the methanotrophic bacterium *Methylococcus capsulatus* (Bath) (strain NCIMB 11132), and the heterotrophic bacteria DB3 (strain NCIMB 13287) and DB5 (strain NCIMB 13289), optionally in combination with DB4 (strain NCIMB 13288). The role of DB3 is to utilize acetate and propionate produced by *M. capsulatus* (Bath) from ethane and propane in the natural gas. DB3 may account for up to 10%, e.g. about 6 to 8%, of the total cell count of the resulting biomass. The role of DB4 and DB5 is to utilize lysis products and metabolites in the medium. Typically, DB4 and DB5 will each account for less than 1% of the cell count during continuous fermentation.

During production of the single-cell material, the pH of the fermentation mixture will generally be regulated to between about 6 and 7, e.g. to 6.5±0.3. Suitable acids/bases for pH regulation may be readily selected by those skilled in the art. Particularly suitable for use in this regard are sodium hydroxide and sulphuric acid. During fermentation the temperature within the fermentor should preferably be maintained to within the range of from 40° C. to 50° C., most preferably 45° C.±2° C.

Suitable fermentors for use in preparing the single-cell material are those of the loop-type, such as those described in DK 1404/92, EP-A-418187, EP-A-306466 and PCT/GB02/003798, or air-lift reactors. A loop-type fermentor having static mixers results in a high utilization of the gases (e.g. up to 95%) due to the plug-flow characteristics of the fermentor. Gases are introduced at several positions along the loop and remain in contact with the liquid until they are separated in the headspace of the reactor. Continuous fermentation may be achieved using 2-3% biomass (on a dry weight basis) and a dilution rate of 0.02 to 0.50 $h^{-1}$, e.g. 0.05-0.25 $h^{-1}$.

Other fermentors may be used in preparing the single-cell material and these include tubular and stirred tank fermentors.

Ideally, the biomass produced from fermentation of natural gas will comprise from 60 to 80% by weight crude protein; from 5 to 20% by weight crude fat; from 3 to 10% by weight ash; from 3 to 15% by weight nucleic acids (RNA and DNA); from 10 to 30 g/kg phosphorus; up to 350 mg/kg iron; and up to 120 mg/kg copper. Particularly preferably, the biomass will comprise from 68 to 73%, e.g. about 70% by weight crude protein; from 9 to 11%, e.g. about 10% by weight crude fat; from 5 to 10%, e.g. about 7% by weight ash; from 8 to 12%, e.g. about 10% by weight nucleic acids (RNA and DNA); from 10 to 25 g/kg phosphorus; up to 310 mg/kg iron; and up to 110 mg/kg copper. The amino acid profile of the protein content should be nutritionally favourable with a high proportion of the more important amino acids cysteine, methionine, threonine, lysine, tryptophan and arginine. Typically these may be present in amounts of about 0.7%, 3.1%, 5.2%, 7.2%, 2.5% and 6.9%, respectively (expressed as a per cent of the total amount of amino acids). Generally the fatty acids will comprise mainly the saturated palmitic acid (approx. 50%) and the monounsaturated palmitoleic acid (approx. 36%). The mineral content of the product will typically comprise high amounts of phosphorus (about 1.5% by weight), potassium (about 0.8% by weight) and magnesium (about 0.2% by weight).

Typically, the resulting biomass will be produced in the form of a flowable aqueous paste or slurry. Generally this will consist essentially of whole cell material, although a proportion of ruptured cell material may also be present.

Following production of the biomass, this is generally concentrated from the fermentation medium, for example by conventional centrifugation and/or filtration methods, e.g. ultrafiltration. Concentration of the biomass may be effected by centrifugation alone. During centrifugation the dry matter content of the biomass is typically increased to about 5 to 18% by weight, preferably 8 to 15%, e.g. about 14% by weight. If necessary, or indeed desirable, filtration (e.g. ultrafiltration) methods may be used to further increase the solids content of the biomass. Ultrafiltration, which may be effected at a temperature of between 40 and 50° C., e.g. between 42 and 46° C., further concentrates the biomass to a product containing from 10 to 30%, preferably from 15 to 25%, e.g. from 18 to 22% by weight single-cell material. The size exclusion used during ultrafiltration will generally be in the range of about 100,000 Daltons. The resulting biomass will be in the form of an aqueous slurry and will typically have a solids content in the range of from 10 to 30%, preferably 15 to 25%, e.g. about 20% by weight.

Prior to autolysis the biomass may optionally be subjected to a homogenization process in which the microbial cell walls are broken thereby releasing a portion of protein material from within the cell structure. If necessary, the resulting homogenate may be subjected to further filtration (e.g. ultrafiltration) methods.

Homogenization results in the production of a product comprising, preferably consisting essentially of, ruptured cell material. For example, ruptured cell material will be present in an amount of at least 80%, preferably at least 90% by weight. Typically, the product will be a relatively viscous protein slurry containing soluble and particulate cellular components.

The step of homogenization is believed to have little, if any, effect on the flavor characteristics (i.e. taste) of the final product, but may serve to increase the yield of dry matter in the soluble fraction of the autolysed material. For example, this may increase the dry matter content of the soluble fraction by as much as 20 to 25%. The extent to which the dry matter content is increased is also dependent on the duration of the autolysis process. Autolysis of a homogenized material for a period of 24 hours may, for example, be expected to result in a product in which the yield of the soluble fraction is up to 60% by weight. In the absence of an homogenization step prior to autolysis, the yield of the soluble fraction may be expected to be about 50% by weight.

Disruption or disintegration of the cells may be achieved, for example, by a mechanical process such as by a sequence of pressurizing and depressurizing the microbial material. Although homogenization may be effected by any conventional means, preferably this will be carried out by a high pressure homogenization process in which the biomass is subjected to a change in pressure, preferably a pressure drop, capable of effecting cell disintegration. Typically, the material may be subjected to a pressure drop in the range of from 40 MPa to 120 MPa (400 to 1200 bar), more preferably from 50 MPa to 110 MPa (500 to 1100 bar), e.g. from 60 MPa to 100 MPa (600 to 1000 bar). A pressure drop of about 1000 bar is especially preferred. Generally, the drop in pressure will be instantaneous. Typically the process will be effected in an industrial homogenizer, e.g. available from APV Rannie, Denmark, under controlled temperature conditions, preferably at a temperature of less than 58° C., particularly preferably from 25 to 50° C., e.g. from 25 to 35° C. A homogenization process suitable for use in the invention is described, for example, in WO 01/60974 (to Norferm DA).

Other methods known in the art may be used to effect homogenization in accordance with the invention. For example, homogenization may be effected by subjecting the single-cell material to shear forces capable of disrupting the cell walls. This may be achieved using a mixer in which the material is passed through a zone in which shear forces are exerted upon it by surfaces moving relative to each other. Generally, the shear forces will be created between a moving surface, e.g. a rotating surface, and a static surface, i.e. as in a rotor-stator such as described in WO99/08782.

Other techniques known for use in methods of mechanical cell disintegration, e.g. high speed ball milling, may be used to effect homogenization. Ultrasound methods may also be used.

In a preferred aspect the invention provides a process for the production of a feedstuff or feedstuff component, e.g. a palatability-enhancing material (e.g. a flavor-enhancing agent), said process comprising the following steps:

(a) preparing an aqueous slurry of a microbial culture comprising a methanotrophic bacterium optionally in combination with one or more heterotrophic bacteria;

(b) optionally homogenizing the slurry, preferably by subjecting the slurry to a pressure drop capable of effecting cell disintegration, e.g. a pressure drop in the range of from 40 MPa to 120 MPa, preferably from 50 MPa to 110 MPa, especially from 60 MPa to 100 MPa, whereby to produce a homogenized product; and (c) subjecting the resulting product to autolysis.

Following autolysis the autolysate is preferably heated, typically to a temperature in the range of from 58 to 75° C., preferably 65 to 69° C., e.g. about 67° C.

The autolysate comprises a mixture of soluble and insoluble cellular material. Whilst this may be used directly (i.e. without further processing) as a component or precursor in food products (e.g. as a palatability-enhancing or flavouring component), it is preferable to separate the insoluble cellular material. This may be effected by separation processes known in the art, preferably by filtration, e.g. ultrafiltration. Ultrafiltration, which may be effected at a temperature of between 40 and 75° C., e.g. between 50 and 70° C., is effective to filter out amino acids, peptides and other small molecules such as nucleotides which are able to cross the filter membrane. It is this soluble fraction or permeate which will mainly be used in the production of food products, e.g. as a palatability enhancing agent. The size exclusion used during ultrafiltration will generally be in the range of about 20 kD. However, filters having a MW cut-off in the range of from 10 to 100 kD may be used. To improve the yield of product, the autolysate may be washed repeatedly (e.g. up to 5 times, e.g. up to 3 times) with water followed by additional ultrafiltration steps.

Following separation of the autolysate the solids content of the soluble fraction may be expected to be about 3 to 8% by weight. The content of glutamic acid and free amino acids (on a dry matter basis) may be expected to be in the range of about 5 to 11% and 40 to 50% respectively.

If desired, further reduction in the water content of the product can be achieved by evaporation methods known in the art. For example, this may be used to produce a product having a solids content in the range of from 20 to 70% by weight, e.g. about 30% by weight. Suitable evaporation methods include falling-raising film evaporation, falling film evaporation and flash evaporation. If necessary, the step of evaporation may be repeated several times, for example three times. In the event of foaming problems during evaporation, an anti-foaming agent such as Kirnol V39360 (available from Grunau Illertissen GmbH, Germany) may be added. The amount of foaming agent required to prevent foaming may be readily determined by those skilled in the art. Appropriate amounts of foaming agent may lie in the range of from 0.01 to 0.05%, e.g. about 0.02% by weight.

Immediately following evaporation the product is preferably cooled, for example to a temperature in the range of from 5 to 20° C., e.g. to a temperature of about 15° C.

Typically, the product will be further processed in accordance with spray drying techniques well known in the art. Any conventional spray drier with or without fluid bed units may be used, for example the Type 3-SPD spray drier available from APV Anhydro, Denmark. Preferably the inlet temperature for the air in the spray drier may be about 140 to 250° C. and the outlet temperature may be about 80 to 95° C. Preferably the resulting product will have a water content of from about 1 to 10% by weight, e.g. from 2 to 7% by weight.

The resulting product is very hygroscopic and should therefore be stored in a moisture free environment (e.g. in dry bags) at low temperatures.

As a result of the autolysis process herein described the products produced in accordance with the invention are rich in free amino acids, especially glutamic acid, and peptides. Such products are generally pale in colour, neutral in taste and highly soluble in water (e.g. totally soluble to produce a 1% solution in warm water). These are especially useful as a component or precursor in food products, particularly when used as a palatability enhancer or flavouring agent, e.g. to improve the flavor of human or animal foods (e.g. animal feeds).

Viewed from a further aspect the invention provides an autolysed product derived from a methanotrophic bacterium-containing biomass, or from a derivative thereof (e.g. a homogenized derivative), said product having an amino acid content in the range of from 40 to 80%, e.g. from 50 to 60% by weight (on a dry matter basis). A preferred product in accordance with the invention is that having a glutamic acid content in the range of from 5 to 11%, e.g. from 8 to 10% by weight (on a dry matter basis).

Viewed from a yet further aspect the invention provides the use of an autolysed material or processed derivative thereof as herein described as, in or as a precursor for a foodstuff, preferably as a palatability enhancer, e.g. as a flavor component.

Viewed from a yet still further aspect the invention provides a food product comprising an autolysed material or processed derivative thereof as herein described.

When used as a palatability enhancer in food products, the autolysed material, or processed autolysed material, will be used in an amount effective for its flavor and/or smell to be observed by the consumer. Especially preferably, this will be employed in an amount effective to improve the palatability of the food. Typically, this may be used in an amount of from 0.1 to 4% by weight, preferably up to 2% by weight. The exact proportion will depend on several factors, not least the nature of the food to which the product is to be added, the manner of application or inclusion etc. Appropriate levels may readily be determined by those skilled in the art.

The autolysed product herein described may be used as a substitute for traditional yeast derivatives. Foods to which the product may be added include both human and animal foods. For example, this may be incorporated into food products for human consumption such as soups, gravies, dressings, meat products such as meatballs, emulsions such as mayonnaise, etc. The product herein described finds particular use as a flavouring agent in both wet and dry pet foods, preferably dry pet foods. For example, this may be used as an additive to dog foods.

A by-product of the process herein described is the retentate (i.e. the insoluble fraction) produced following separation of the autolysed material. This product generally comprises components such as cell wall fragments and has a high nutritional value. For example, this product may have the following characteristics:

Water content (determined according to M101[1]): 1-10 wt. %, e.g. about 4 wt. %;
Ash content (determined according to EU Commission Directive No. 162/67/EØF): 3-12 wt. %, e.g. about 10 wt. %;
Crude fat (determined according to EU Commission Directive No. 93/28/EØF): 10-20 wt. %, e.g. about 15 wt. %;
Crude protein (determined according to EU Commission Directive No. 72/199/EØ): 40-60 wt. %, e.g. about 54 wt. %;
RNA (determined according to M105[2]): 4-10 wt. %, e.g. about 6 wt. %;
DNA (determined according to M105[2]): 2-5 wt. %, e.g. about 3 wt. %;
Total amino acids content (determined according to M295[3]): 39-41 wt. %;
Total carbohydrate (determined according to M140[4]): up to 15% wt, e.g. 1 to 12% wt, typically about 10% wt; and
In vitro digestibility (determined according to M150[5]): 65-85% of N, e.g. about 65% of N.

1: the water in the sample is evaporated at 105° C. overnight. The water content is determined by weighing before and after drying.
2: see Herbert et al., Chemical Analysis of Microbial cells, Methods Microbiol. 5B: 285-328, 1971.
3: see Waters AccQ.Tag Chemistry Package. Instruction Manual 052874TP, Rev. 1, and Wandelen et al., Journal of Chromatography A, 763, 11-22.
4: see Herbert et al., Chemical Analysis of Microbial cells, Methods Microbiol. 5B: 267-269, 1971.
5: see Boisen, CAB International, p. 135-145, 1991.

This by-product may be used in food products, in particular as a nutritional additive to animal feeds. This has also been found to have good emulsifying properties and therefore also finds use as an emulsifier in human food products. This product and its use in food products form further aspects of the invention.

Figure 2:
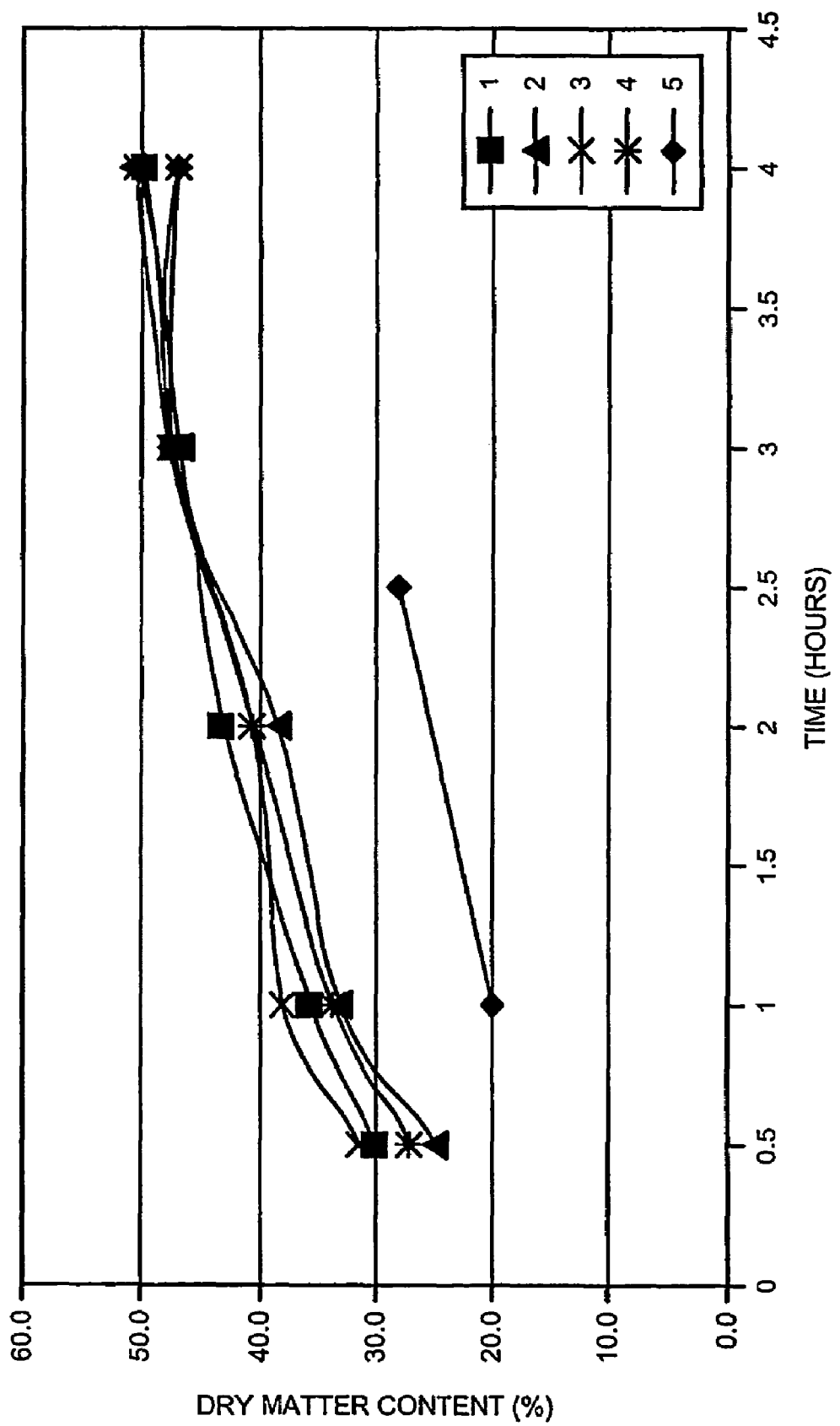
Figure 3:
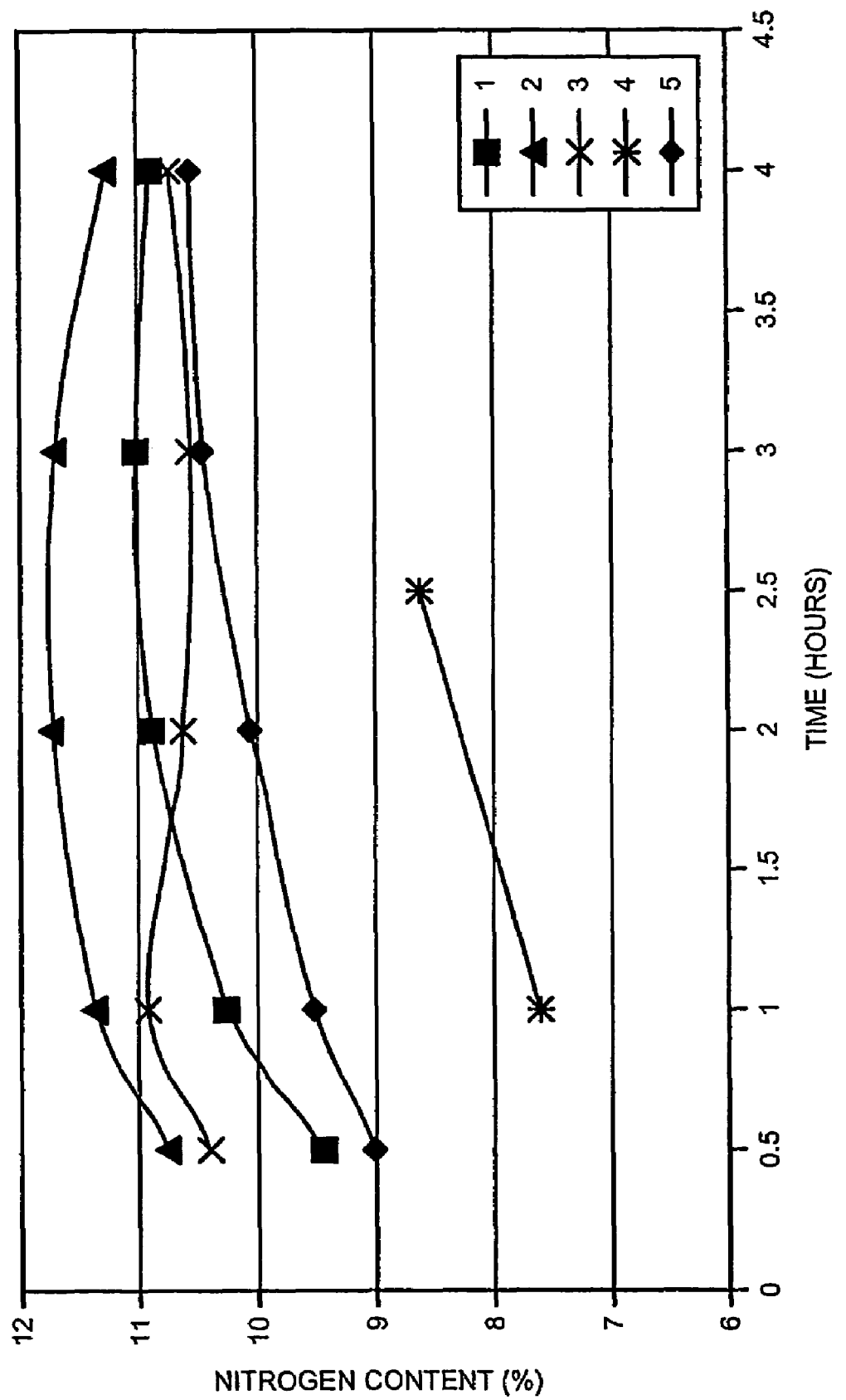
Figure 4:
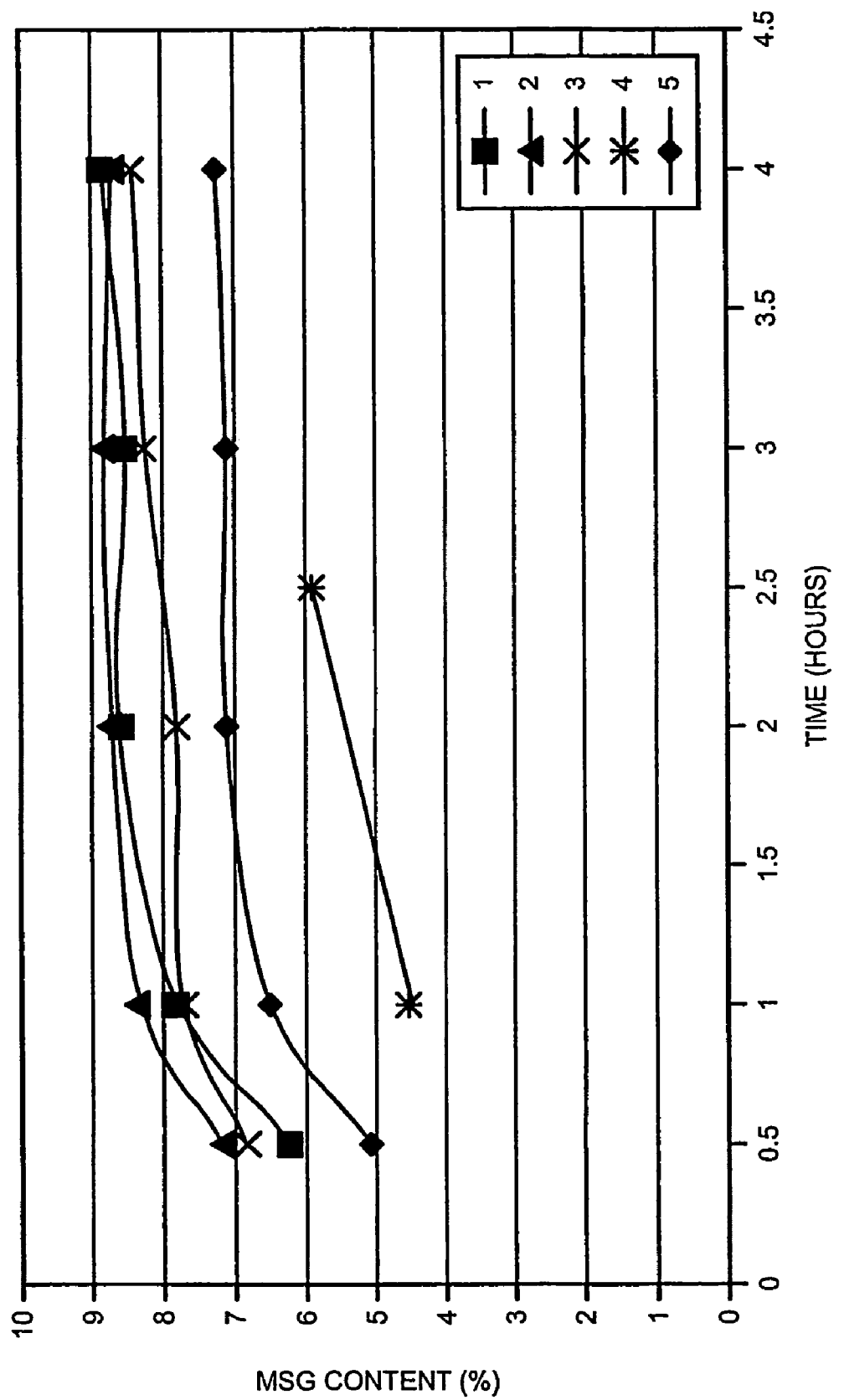
Figure 5:
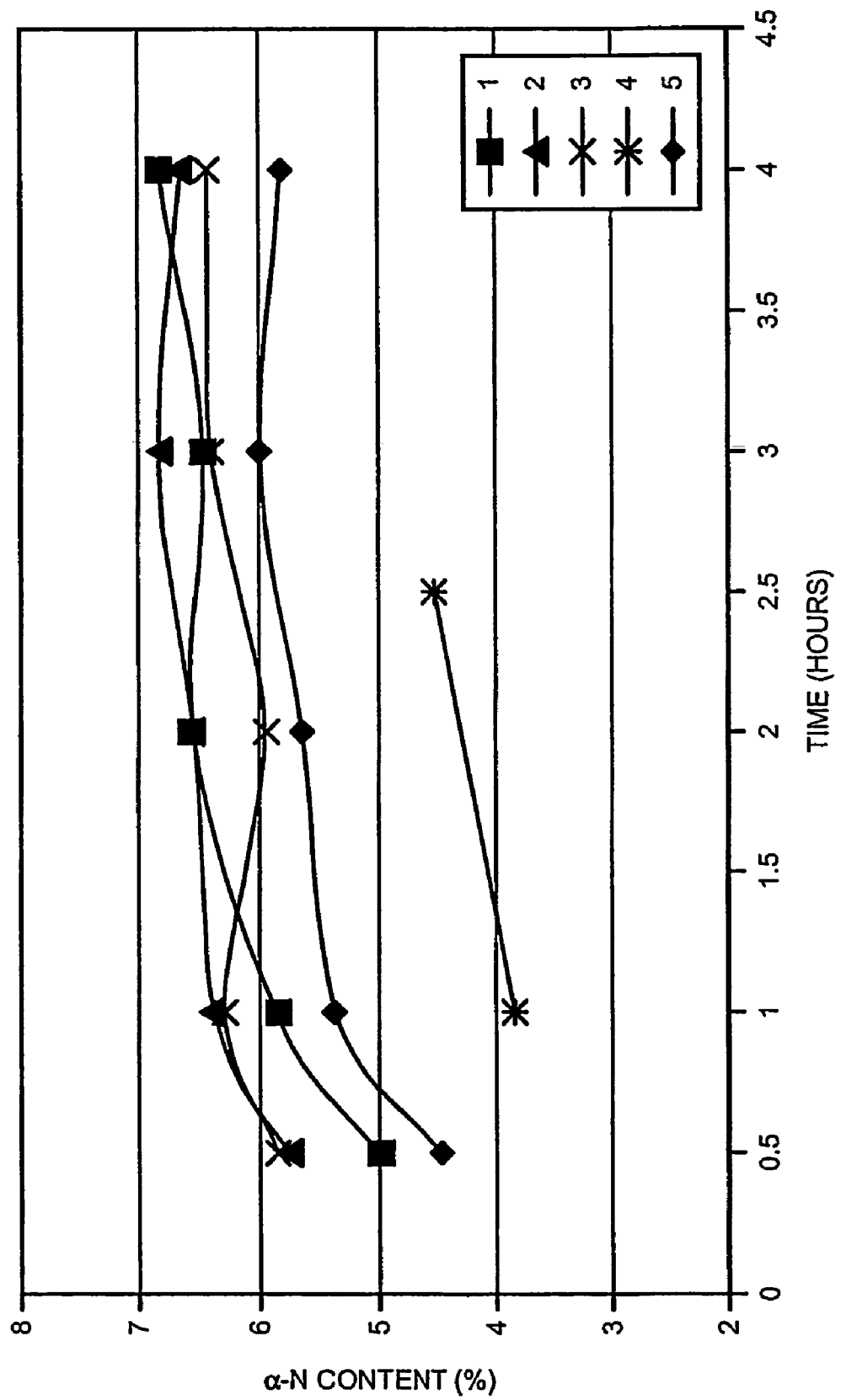
Figure 6:
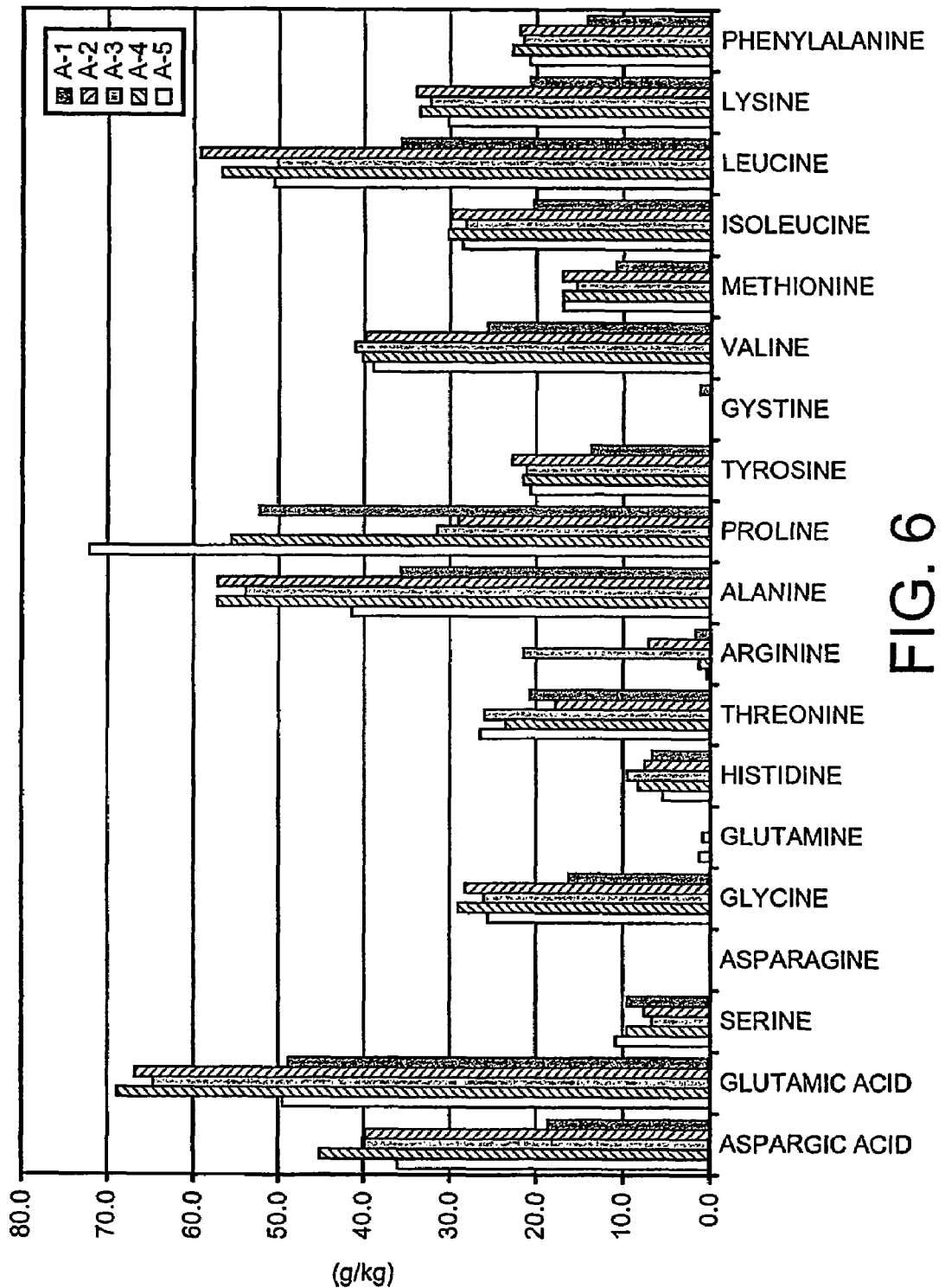
Figure 7:
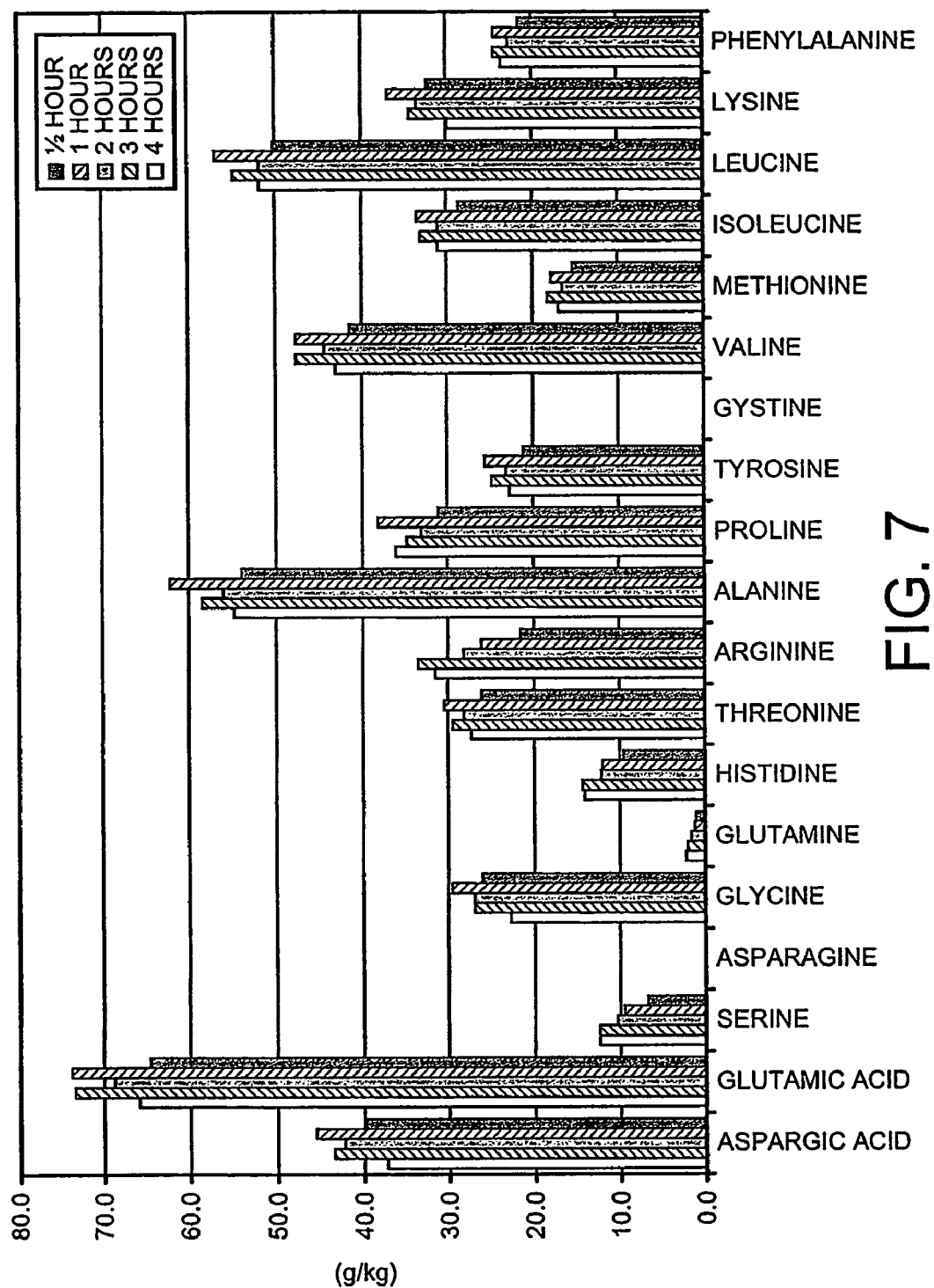
Figure 8:
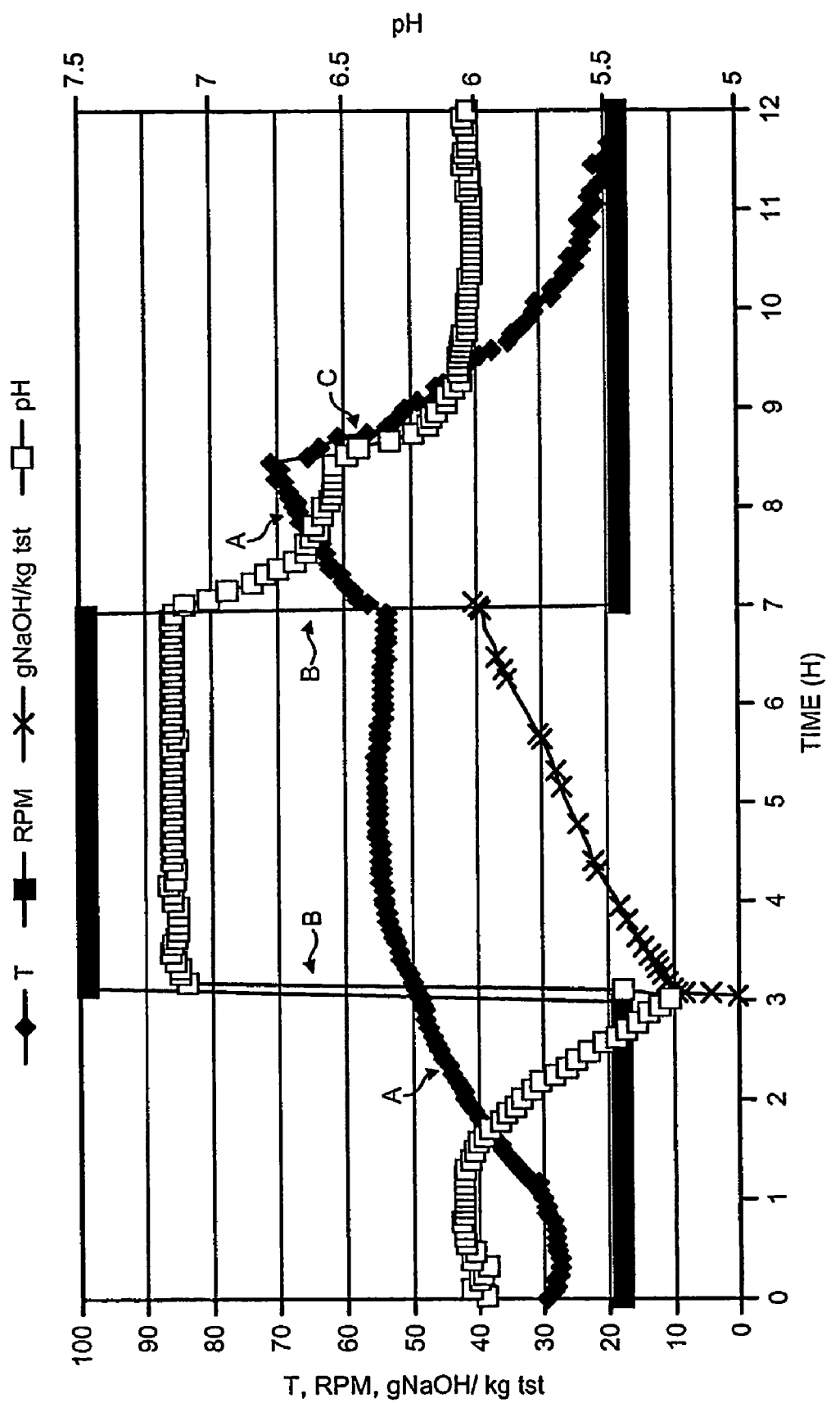
Figure 9:
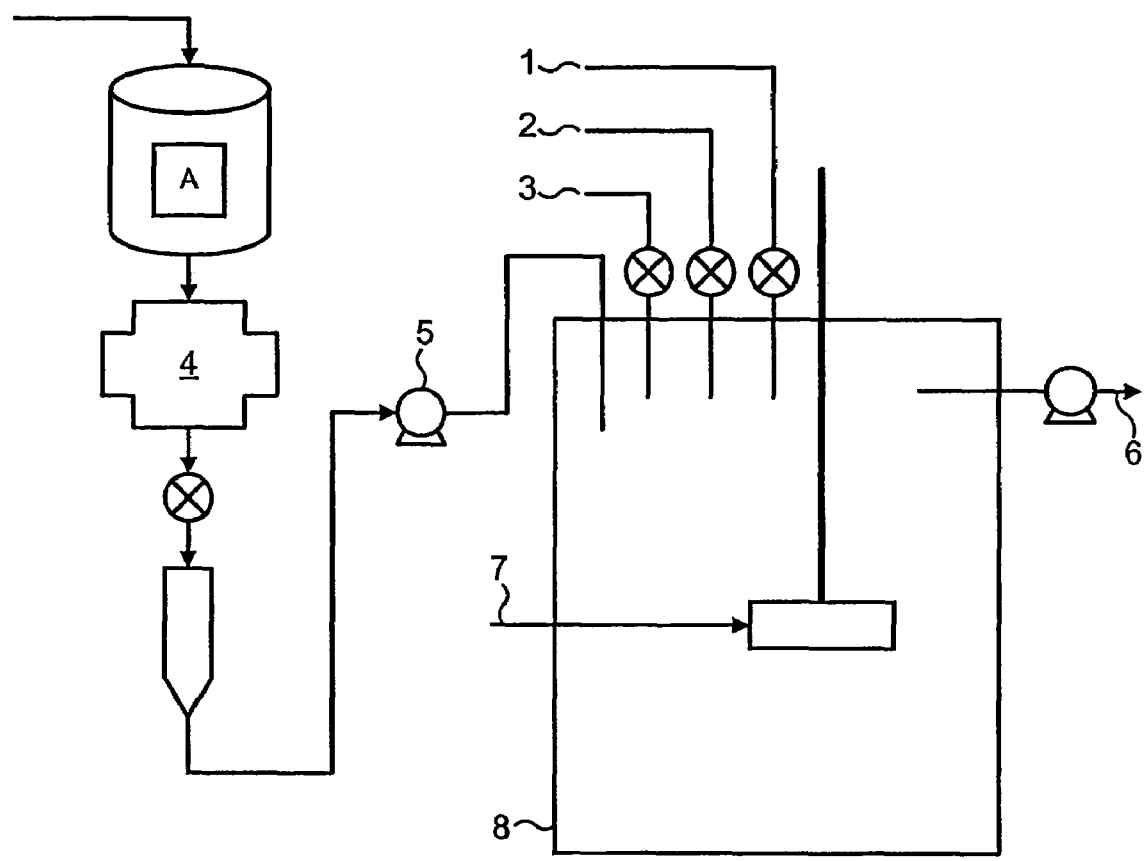
Figure 10:
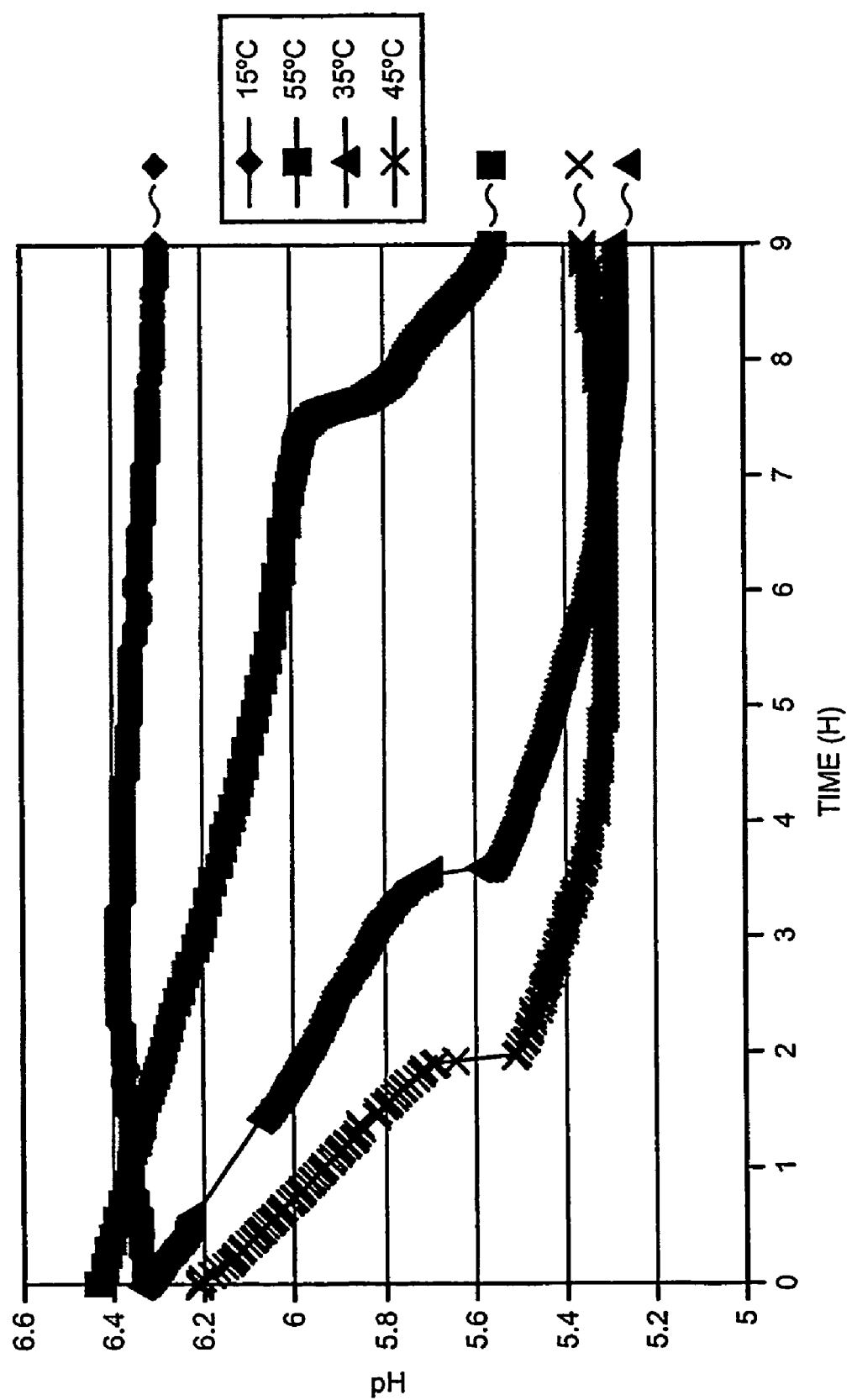
Figure 11:
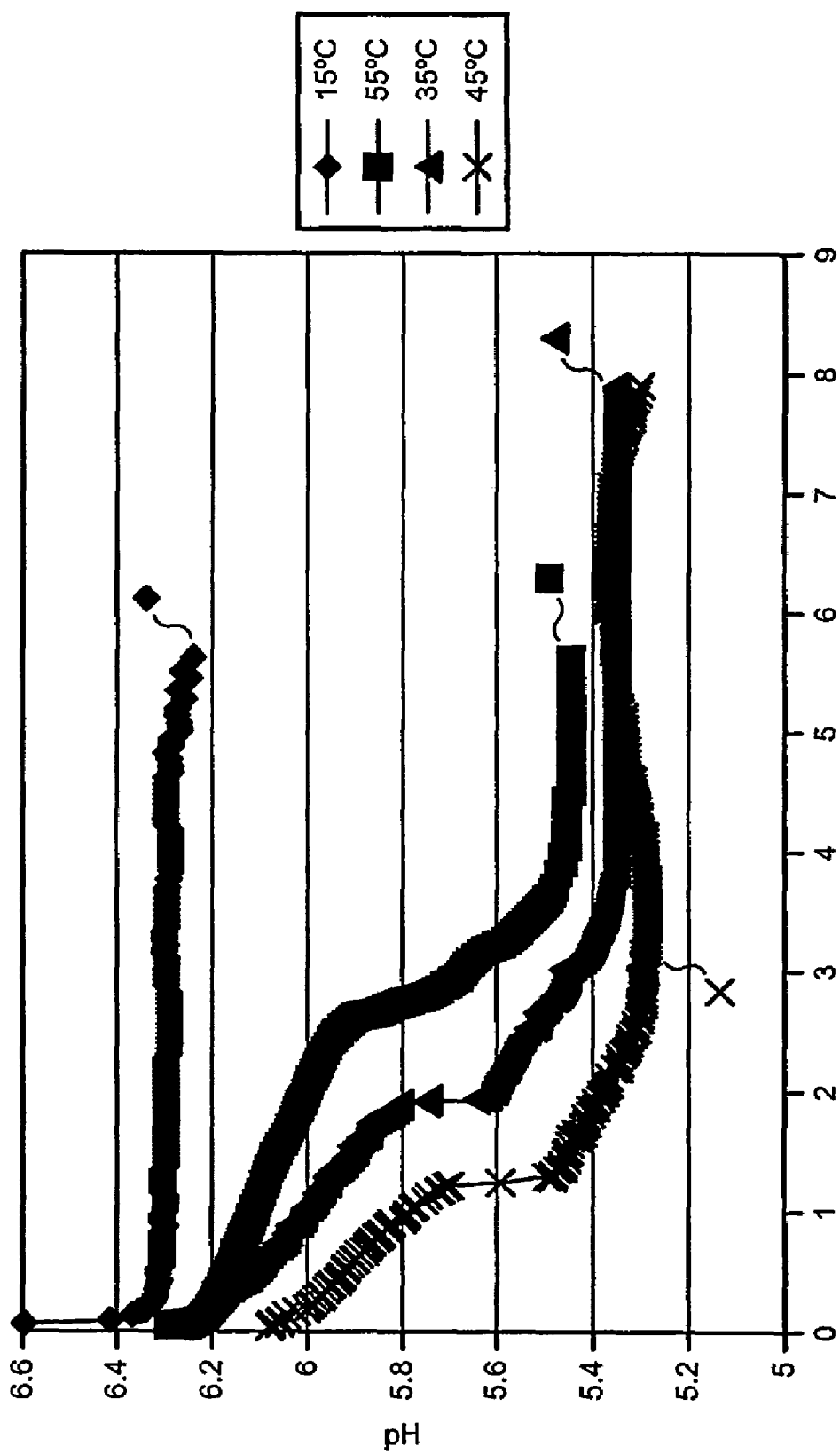
Figure 12:
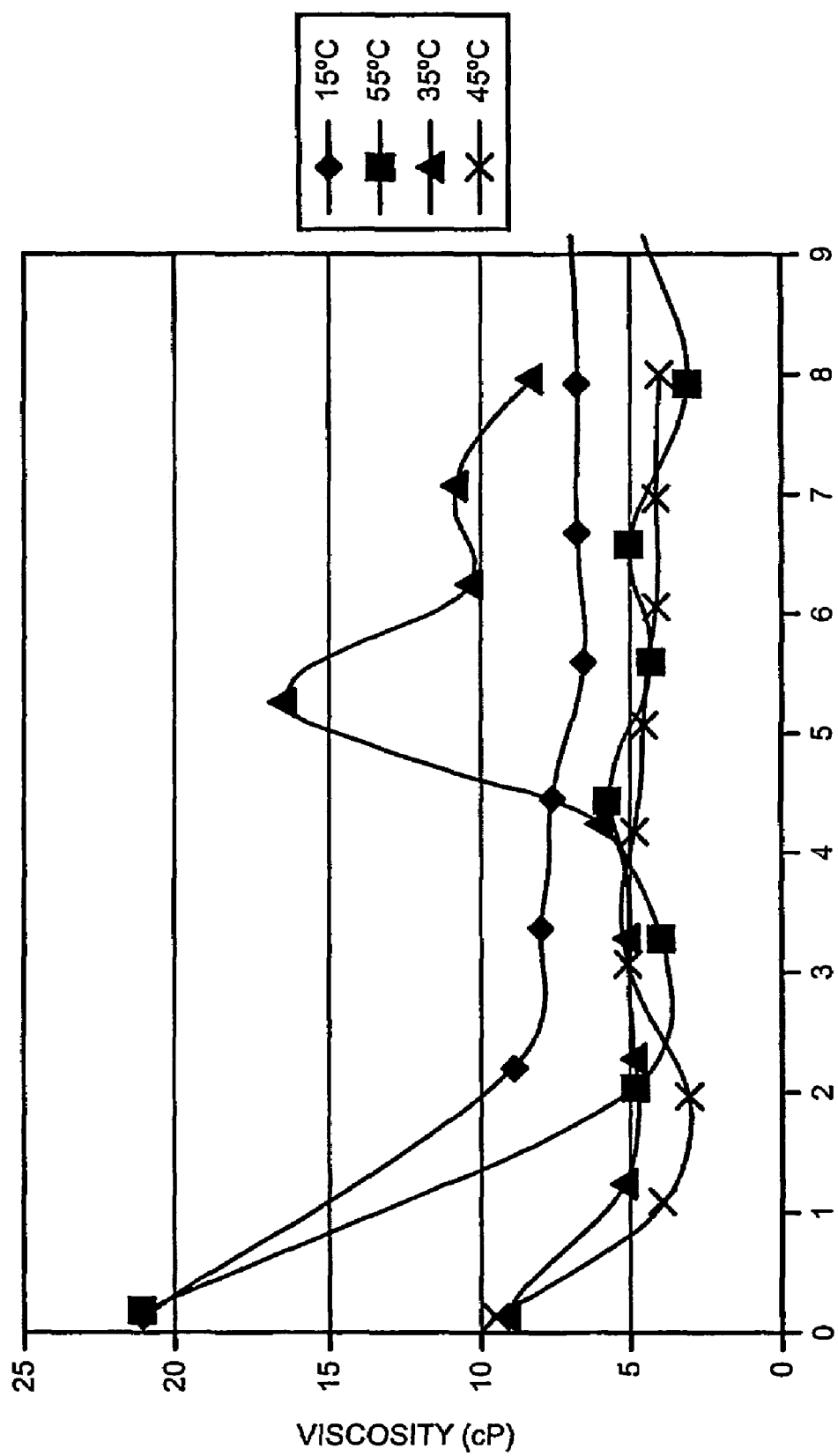

The invention will now be described in more detail in the following non-limiting Examples and with reference to the accompanying Figures in which:

FIG. 1 schematically illustrates apparatus for use in carrying out a process in accordance with the invention;
FIG. 2 shows the dry matter content, as a function of incubation time, in various autolysates in accordance with the invention following ultrafiltration (MW cut-off 20,000 D);
FIG. 3 shows the nitrogen content, as a function of incubation time, in various autolysates in accordance with the invention;
FIG. 4 shows the content of MSG, as function of incubation time, in various autolysates in accordance with the invention;
FIG. 5 shows the $\alpha$-N content, as a function of incubation time, in various autolysates in accordance with the invention;
FIG. 6 shows the free amino acid content of various autolysates in accordance with the invention;
FIG. 7 shows the free amino acid content, as a function of incubation time, in an autolysate product in accordance with the invention (Autolysate-3);
FIG. 8 shows schematically the time course of an autolysis procedure according to the invention;
FIG. 9 is a plot of pH versus time;
FIG. 10 is a plot of pH versus time;
FIG. 11 is a plot of viscosity versus time; and
FIG. 12 is a plot of viscosity versus time.

EXAMPLE 1

Preparation of Autolysate

A microbial culture comprising *Methylococcus capsulatus* (Bath) (strain NCIMB 11132), DB3 (strain NCIMB 13287) and DB5 (strain NCIMB 13289), is produced in a loop-type fermentor by continuous aerobic fermentation of natural gas in an ammonium/mineral salts medium (AMS) at 45° C., pH 6.5. The AMS medium contains the following per liter: 10 mg $NH_3$, 75 mg $H_3PO_4.2H_2O$, 380 mg $MgSO_4.7H_2O$, 100 mg $CaCl_2.2H_2O$, 200 mg $K_2SO_4$, 75 mg $FeSO_4.7H_2O$, 1.0 mg $CuSO_4.5H_2O$, 0.96 mg $ZnSO_4.7H_2O$, 120 µg $CoCl_2.6H_2O$, 48 µg $MnCl_2.4H_2O$, 36 µg $H_3BO_3$, 24 µg $NiCl_2.6H_2O$ and 1.20 µg $NaMoO_4.2H_2O$.

The fermentor is filled with water which has been heat-treated at 125° C. for 10 secs. Addition of the different nutrients is regulated according to their consumption. With gradual build-up over time, continuous fermentation is operated with 1-3% biomass (on a dry weight basis).

The biomass is subjected to centrifugation in an industrial continuous centrifuge at 3,600 rpm, followed by ultrafiltration using membranes having an exclusion size of 20,000 Daltons. The resulting product, which contains about 12-20% by weight biomass, is then optionally subjected to homogenization in an industrial homogenizer (pressure drop: 1000 bar (100 MPa); inlet temperature: 15° C.) to produce a homogenized biomass.

The 12% suspension of biomass is heated to the optimum reaction temperature of 55° C. and the pH is adjusted to 7.0-7.5 by the addition of NaOH. Incubation time is 4 hours during which time the temperature of the material is kept within the range of from 50 to 55° C. and the pH is maintained in the optimal range of from 7.0 to 7.5

Following incubation the biomass is subjected to ultrafiltration at a temperature in the range of from 50 to 70° C. using a membrane having a molecular weight cut-off of about 20 kD. If necessary, repeated washing of the biomass with water followed by further ultrafiltration steps can be used to increase the desired yield of permeate which will contain about 4.2% by weight dry matter.

The resulting permeate is cooled and stored in a sealed container prior to steam treatment.

Evaporation at a temperature in the range of from 60 to 70° C. in the presence of an anti-foaming agent further increases the solids content of the permeate to about 35% by weight.

EXAMPLE 2

Preparation and Properties of Autolysates

Method

Autolysates were produced in accordance with the following procedure:
1. A microbial culture (biomass) is produced by a fermentation process as described in Example 1. The collected biomass is concentrated to 6-8% dry solids basis by centrifugation.
2. Homogenization: pressure drop from 1000 to 0 bar.
3. The homogenizate is subjected to ultra-filtration.
4. The temperature and pH are adjusted as in Table 1 (see below).
5. Incubation for 4 hours.
6. After incubation, 1.1 L filtrate (20,000 MW cut-off) is separated out.
7. The filtrate is sterilized by heating to 90° C. for 10 minutes.
8. After sterilization, the autolysate is cooled and placed in a freezer.
9. Filtration (maximum 20% dry solids).
10. The concentrate is cooled and spray dried (inlet/outlet temperature: 200° C./90° C.) and the samples are marked as Autolysates 1 to 5.

the sample is then freeze dried. The freeze dried samples are analysed for the following properties: protein, amino-Nitrogen, MSG (glutamic acid) and free amino acid contents.

Results and Discussion

Taste Test

In a taste test only minimal differences in taste between Autolysates 1 to 4 were found with a small expressed preference for Autolysate-3. The intensity of the "yeasty note" was comparable to standard light yeast as used today. The taste of Autolysate-5 was disagreeable.

Chemical Analysis

In the preparation of Autolysates 1-4, samples were taken at ½, 1, 2, 3 and 4 hours to determine how the product develops over time.

FIG. 2 shows the increase over time of the dry matter content of the various samples following ultrafiltration (MW cut-off 20,000 D). The results show that the autolysis process progresses essentially linearly when the incubation temperature is in the range of from 45 to 55° C. and the pH lies in the range 7 to 8. After ½hour, about 30% dry matter passes the filter, after 2 hours about 40% and after 4 hours about 48%. Earlier experiments had shown that after 24 hours incubation about 55% dry matter passed the filter. FIG. 3 shows that the nitrogen content (proteins, peptides and free amino acids) in the product is about 11% by weight for incubation times between 2 and 4 hours.

After 2 hours incubation, the MSG (glutamic acid) content of the Autolysates is essentially constant (see FIG. 4). A glutamic acid content between 8 and 9% by weight is particularly favourable compared to conventional yeast autolysates which typically have an MSG content between 3 and 7%.

FIG. 5 shows the degree of hydrolysis of protein in the Autolysates ($\alpha$-N is an expression for the number of free

TABLE 1 production parameters for Autolysates 1-5

| Parameter | Autolysate 1 | Autolysate 2 | Autolysate 3 | Autolysate 4 | Autolysate 5* |
|---|---|---|---|---|---|
| Homogenization | + | + | + | + | + |
| Temp. (° C.) | 45 | 45 | 55 | 55 | 45 |
| pH | 7 | 8 | 7 | 8 | 6.5-5.8 |
| Incubation time (hours) | 4 | 4 | 4 | 4 | 2.5 |

*this is the residue of the homogenized biomass after filtration with a MW cut-off of 20,000 D.

During the step of ultra-filtration (step 6), the properties of the product (i.e. the filtrate or permeate) are determined at various stages. 100 mL of filtrate is taken out at 30 mins, 1 hour, 2 hours and 3 hours following the start of incubation (for Autolysate-5 the samples are only tested up to 1 hour). The filtration samples are each sterilized as described in step 7. For each sample (as well as samples of the final products, i.e. after 4 hours incubation), dry matter content is measured and $\alpha$-amino groups present in the product). The degree of hydrolysis of the product is thus calculated as: $\alpha\text{-N}\times100\%/\text{N}$. For each autolysate in accordance with the invention the degree of hydrolysis is about 60% showing that a large proportion of the product consists of free amino acids. This is confirmed by the amino acid analysis (see Table 2) which showed that 50 to 60% of the autolysates is made up of free amino acids.

TABLE 2

Content of free amino acids (in wt. %) in Autolysates. A-1 to A-5 refer to Autolysates 1 to 5. A-3-2 is a sample of A-3 extracted at 2 hour.

| Amino acid | A-1 | A-2 | A-4 | A-5 | A-3-2 | A-3-1 | A-3-2 | A-3-3 | A-3-4 |
|---|---|---|---|---|---|---|---|---|---|
| Aspargic acid | 3.6 | 4.5 | 4.0 | 1.9 | 3.7 | 4.3 | 4.2 | 4.5 | 4.0 |

TABLE 2-continued

Content of free amino acids (in wt. %) in Autolysates. A-1 to A-5 refer to Autolysates 1 to 5. A-3-2 is a sample of A-3 extracted at 2 hour.

| Amino acid | A-1 | A-2 | A-4 | A-5 | A-3-2 | A-3-1 | A-3-2 | A-3-3 | A-3-4 |
|---|---|---|---|---|---|---|---|---|---|
| Glutamic acid | 5.7 | 6.9 | 6.7 | 4.9 | 6.5 | 7.3 | 6.8 | 7.3 | 6.4 |
| Serine | 1.1 | 1.0 | 0.7 | 0.9 | 1.3 | 1.3 | 1.0 | 0.9 | 0.7 |
| Asparagine | 0 | 0 | 0 | 0 | 0 | 0 | 0 | 0 | 0 |
| Glycine | 2.6 | 2.9 | 2.8 | 1.6 | 2.3 | 2.7 | 2.7 | 3.0 | 2.6 |
| Glutamine | 0.1 | 0 | 0 | 0 | 0.2 | 0.2 | 0.1 | 0.1 | 0.1 |
| Histidine | 0.6 | 0.9 | 0.8 | 0.7 | 1.4 | 1.5 | 1.2 | 1.2 | 1.0 |
| Threonine | 2.6 | 2.4 | 1.8 | 2.1 | 2.6 | 3.0 | 2.8 | 3.0 | 2.6 |
| Arginine | 0.6 | 0.6 | 0.7 | 1.3 | 3.1 | 3.4 | 2.8 | 2.6 | 2.2 |
| Alanine | 4.2 | 5.7 | 5.7 | 3.6 | 5.4 | 5.9 | 5.6 | 6.2 | 5.4 |
| Proline | 7.2 | 5.6 | 2.9 | 5.2 | 2.9 | 3.5 | 3.3 | 3.8 | 3.1 |
| Tyrosine | 2.1 | 2.1 | 2.3 | 1.4 | 2.2 | 2.5 | 2.3 | 2.6 | 2.1 |
| Cystine | 0 | 0 | 0 | 0.2 | 0 | 0 | 0 | 0 | 0 |
| Valine | 3.9 | 4.0 | 4.0 | 2.6 | 4.3 | 4.8 | 4.4 | 4.7 | 4.1 |
| Methionine | 1.6 | 1.7 | 1.7 | 1.1 | 1.7 | 1.8 | 1.7 | 1.8 | 1.6 |
| Isoleucine | 2.9 | 3.0 | 3.0 | 2.1 | 3.2 | 3.3 | 3.1 | 3.4 | 2.9 |
| Leucine | 5.1 | 5.7 | 6.0 | 3.6 | 5.2 | 5.5 | 5.2 | 5.7 | 5.0 |
| Lysine | 3.0 | 3.4 | 3.4 | 2.1 | 3.0 | 3.4 | 3.4 | 3.7 | 3.2 |
| Phenyl alanine | 2.1 | 2.3 | 2.2 | 1.4 | 2.4 | 2.5 | 2.3 | 2.5 | 2.1 |
| Total | 49.0 | 52.7 | 48.7 | 36.7 | 51.4 | 56.9 | 52.9 | 57.0 | 49.1 |

FIG. 6 shows the amino acid composition of the autolysates after 4 hours incubation under the conditions set out in Table 1.

For the most part the different autolysis conditions release equivalent quantities of the amino acids. Exceptionally, a high content of arginine is observed in Autolysate-3 and a high quantity of proline in A-1 and A-2. Comparison with A-5 indicates that proline release is associated with an incubation temperature of 45° C. The glutamic acid content of A-1 is lower than for the other products. Glutamine is only seen in small quantities in A-1 and A-3 (incubation at pH 7). The small variations suggest that it is the same enzymes that operate over the whole range of process conditions studied (pH: 7-8 and incubation temperature: 45-55° C.).

FIG. 7 shows the free amino acid content of A-3 as a function of time. No particular difference in amino acid profile can be seen over the incubation period of ½ to 4 hours, which means that the incubation time can essentially be selected on the basis of desired post ultrafiltration yield (see FIG. 2).

Conclusions

It is possible to alter dry matter content of the starting material (step 1) and incubation time without affecting the important parameters (high MSG and free amino acid contents, total solubility, pale colour, neutral taste) of the autolysate product. Increased dry matter or reduced incubation time reduces the yield. An optimal yield can be determined on the basis of the desired degree of protein hydrolysis in the residue by-product.

EXAMPLE 3

Preparation of Autolysate

An autolysate is produced in accordance with the following procedure:
1. A microbial culture (biomass) is produced by a fermentation process as described in Example 1. The collected biomass is concentrated to 12-22% dry solids basis by centrifugation.
2. Homogenization: pressure drop from 1000 to 0 bar.
3. Autolysis: temperature and pH are adjusted in the range 50 to 55° C. and 7.0 to 7.5 respectively.
4. Incubation: up to 4 hours.
5. The product is sterilized by heating to a temperature in the range 70 to 90° C.
6. The product is spray dried (inlet/outlet temperature: 180-250° C./90° C.).

EXAMPLE 4

Autolysate Procedure

An autolysate is produced in accordance to the following procedure:
1. A microbial culture is produced as described in Example 1. The collected biomass is concentrated to 12-22% dry solids basis by centrifugation and/or ultra-filtration.
2. Homogenisation: pressure drop from 1000 to 0 bar.
3. Autolysis: Temperature and pH are adjusted in the range 50° C. to 55° C. and 7-7.5, respectively.
4. Incubation during autolysis for 2-6 hours.
5. Homogenisation: pressure drop from 1000 to 0 bar.
6. The product is heated to 65-95° C.
7. The product is spray dried (inlet/outlet/feed) 180-300° C./70-95° C./15-70° C.

A process example is given in FIG. 8. Wherein A=heating, B=autolysis, C=cooling.

Analysis is obtained for autolysates according to the procedure above. The results are shown in Table 3 below.

TABLE 3

| Analysis | Processes: short term | | | |
|---|---|---|---|---|
|  | C1 | R1 | C | R |
| Water, % of sample | 8.3 | 6.7 | 8.8 | 7.0 |
| Ash, % of dry matter | 9.4 | 9.3 | 11.5 | 9.8 |
| Crude fat, % of dry matter | 7.5 | 7.1 | 8.6 | 8.9 |
| RNA, % of dry matter | 3.8 | 4.6 | 5.8 | 3.1 |

TABLE 3-continued

|  | Processes: short term | | | |
|---|---|---|---|---|
| Analysis | C1 | R1 | C | R |
| DNA, % of dry matter | 1.1 | 1.3 | 2.9 | 2.8 |
| Crude protein, % of dry matter | 64.5 | 65.2 | 67.2 | 67.6 |
| Protein digestability, in vitro, % of N | 89.5 | 85.2 | 85.4 | 83.7 |
| Protein solubility, % of total protein | 65.0 | 73.8 | 38.3 | 44.3 |
| pH | 7.2 | 7.3 | 7.4 | 7.5 |
| Total glucose, % of dry matter | 6.8 | 8.3 | 4.1 | 4.9 |
| Free glucose, % of dry matter | 0.2 | 0.4 | 0.0 | 0.0 |
| Alpha-amino nitrogen, % of dry matter | 3.9 | 4.1 | 3.7 | 3.6 |
| Amino acids, total % of dry matter | 48.3 | 52.4 | 52.6 | 47.1 |
| Amino acids, free, % of dry matter | 25.6 | 23.8 | 13.1 | 12.7 |

Percentages are by weight
C1: Homogenisation was carried out before autolysis of concentrate
R1: Homogenisation was carried out before autolysis of retentate
C: Autolysis of concentrate
R: Autolysis of retentate The results of autolysis of material after centrifugation and material after centrifugation and subsequent ultrafiltration are almost the same. However there is a large difference when the samples have been homogenised prior to autolysis.

EXAMPLE 5

Alpha-amino Content of Autolysates

A bacterial culture produced as described in Example 1 (5° C.) was homogenised at 900-1000 bar, and stored in containers. After homogenisation the temperature was raised to 44.5° C.

One sample was stored without temperature control, and one sample was stored at 4° C. without any external control of the pH. The pH was recorded manually.

TABLE 4

Temperature, pH and alpha-amino nitrogen (α-N) as a percentage of the dry matter during storage of homogenised cultures.

| | Without temperature control | | | Cooled reference sample | | |
|---|---|---|---|---|---|---|
| Time [h] | Temp. [° C.] | pH | α-N [%] | Temp [° C.] | PH | α-N [%] |
| 0 | 44.5 | 6.6 | 1.12 | 44.5 | 6.6 | 1.12 |
| 0.27 | 44.5 | 6.6 | 1.20 | 10 | 6.7 | 1.02 |
| 0.50 | 44.5 | 6.5 | 1.35 | 4 | 6.7 | 1.15 |
| 0.83 | 41.0 | 6.4 | 1.49 | 4 | 6.7 | 1.16 |
| 1.25 | 40.5 | 6.3 | 1.54 | 4 | 6.7 | 1.19 |
| 2 | 39.0 | 6.1 | 1.64 | 4 | 6.7 | 1.17 |
| 3 | 38.5 | 5.8 | 1.75 | 4 | 6.8 | 1.16 |
| 4.08 | 35.0 | 5.6 | 1.84 | 4 | 6.8 | 1.18 |
| 5.77 | 27.0 | 5.4 | 1.82 | 4 | 6.8 | 1.19 |
| 24 | 22.0 | 5.1 | 2.0 | 4 | 6.8 | 1.34 |

The experiment without temperature control showed a temperature of 44.5° C. initially and a pH of 6.6. After 24 h, the temperature was 22° C. and the pH was 5.1. During this storage the alpha-amino N increased from 1% to 2%.

The experiment with the cooled reference sample, showed no change in the pH. To obtain a pH reduction of this sample further storage is necessary. During the storage the alpha-amino N increased from 1% to 1.34%.

Table 4 shows that the alpha-amino nitrogen content of the homogenised culture is between 1-2% of the dry matter, even after prolonged storage.

The hydrolysis degree is defined as the percentage peptide bonds cleaved. For every peptide bond hydrolysed a free alpha-amino acid is formed. Sufficient autolysis to produce flavor products can be defined by the percentage alpha-amino acid nitrogen of the dry matter. Autolysis to achieve flavor products will result in alpha-amino nitrogen content between 2-6%, 3-5%, or typically 4% wt. For example the basic culture contains 1-1.1% alpha-amino nitrogen, whereas the homogenised product contains 1-2% alpha-amino nitrogen depending upon the storage conditions as shown in Table 4 above. Further increase of the alpha-amino nitrogen of the homogenised product could be obtained by titration at pH 7-7.5 and temperatures above 40° C. On the other hand, a pH of 5-5.5 will stabilize the biomass.

EXAMPLE 6

Controlling pH and Viscosity During the Initial Phase of Autolysis

Concentrate (i.e. material collected after centrifugation) and retentate (i.e. material collected after ultrafiltration) were homogenised at 1000 bar, and temperature was controlled by the means of heat exchangers.

Table 5 and Table 6 below show the process parameters.

TABLE 5

Temperature and dry matter content of Homogenised concentrate for batch experiments up to 9 hours. C—concentrate.

| Sample | C1 | C2 | C3 | C4 |
|---|---|---|---|---|
| Temperature | 45° C. | 35° C. | 25° C. | 15° C. |
| Dry matter | 15.6% | 15.6% | 13.5% | 13.5% |

TABLE 6

Temperature and dry matter content of Homogenised retentate for batch experiments up to 9 hours. R—retentate.

| Sample | R1 | R2 | R3 | R4 |
|---|---|---|---|---|
| Temperature | 45° C. | 35° C. | 25° C. | 15° C. |
| Dry matter | 19.4% | 19.4% | 21.2% | 21.2% |

Batch experiments were done with associated monitoring equipment, buffer tank and homogenisator. FIG. 9 shows the experimental overview wherein A was concentrate or retentate, 1 is the temperature control, 2 is the Red.Ox electrode, 3 is the pH electrode, 4 is the homogenisator at 1000 bar, 5 is the medium feed stream, 6 is the product, 7 is the stirrer and 8 is the autolysis reactor.

Batch hydrolysis of homogenised biomass was done in a Fermentor Drive Assembly Model No. M1200-200 equipped with reactors Model FS-314 (New Brunswick Scientific Co. Inc New Yersey) with 14L total and 10L working volume. The reactors were immersed in a temperature controlled water bath (±1° C.), operated with continuous stirring if not otherwise stated. The pH was logged. The internal pH was checked externally. The reactors were operated without aeration and the stirring speed was 100-300 rpm.

Samples were taken by pumping the biomass under continuous stirring if not otherwise stated. In this case pH and viscosity was measured. Samples for later analysis were stored frozen.

Samples taken from a stirred tank reactor and measured immediately at 2.5 rpm, 5 rpm, 10 rpm, 30 rpm, 50 rpm and 100 rpm by the means of a Brookfield Viscosimeter. In the result section only the measurements at 30 rpm are given.

Results and Discussion

FIGS. 10 and 11 show the pH as a function of time for Homogenised concentrate and retentate, respectively.

At 15° C. after 5-9 hours, the pH was stable for Homogenised concentrate and retentate, see FIGS. 10 and 11. At higher temperatures, the pH was reduced from 6.2-6.4 to 5.2-5.4, and the pH reduction rate increased with temperature. For the Homogenised retentate, the pH reduction rate was almost twice the speed of Homogenised concentrate. The differences between concentrate and retentate could be explained by the dry matter content or the status of the biomass at the different processing steps. However, in the end all experiments stabilised at a pH 5-5.5.

The reduced pH was probably caused by acid formation from limited peptide degradation and/or sugar conversion. Sugar conversion could be used to reduce the content of reducing sugars before the autolysis step of autolysate. The degree of hydrolysis (DH) is defined as the percentage peptide bonds cleaved. For every peptide bond hydrolysed a free alfa-amino acid is formed. The product can be defined by the percentage alpha-amino acid nitrogen of the dry matter. Autolysis to achieve flavor product (as defined previously) will result in an alpha-amino nitrogen content between 2-6%, 3-5%, or typically 4%.

Figure 13:
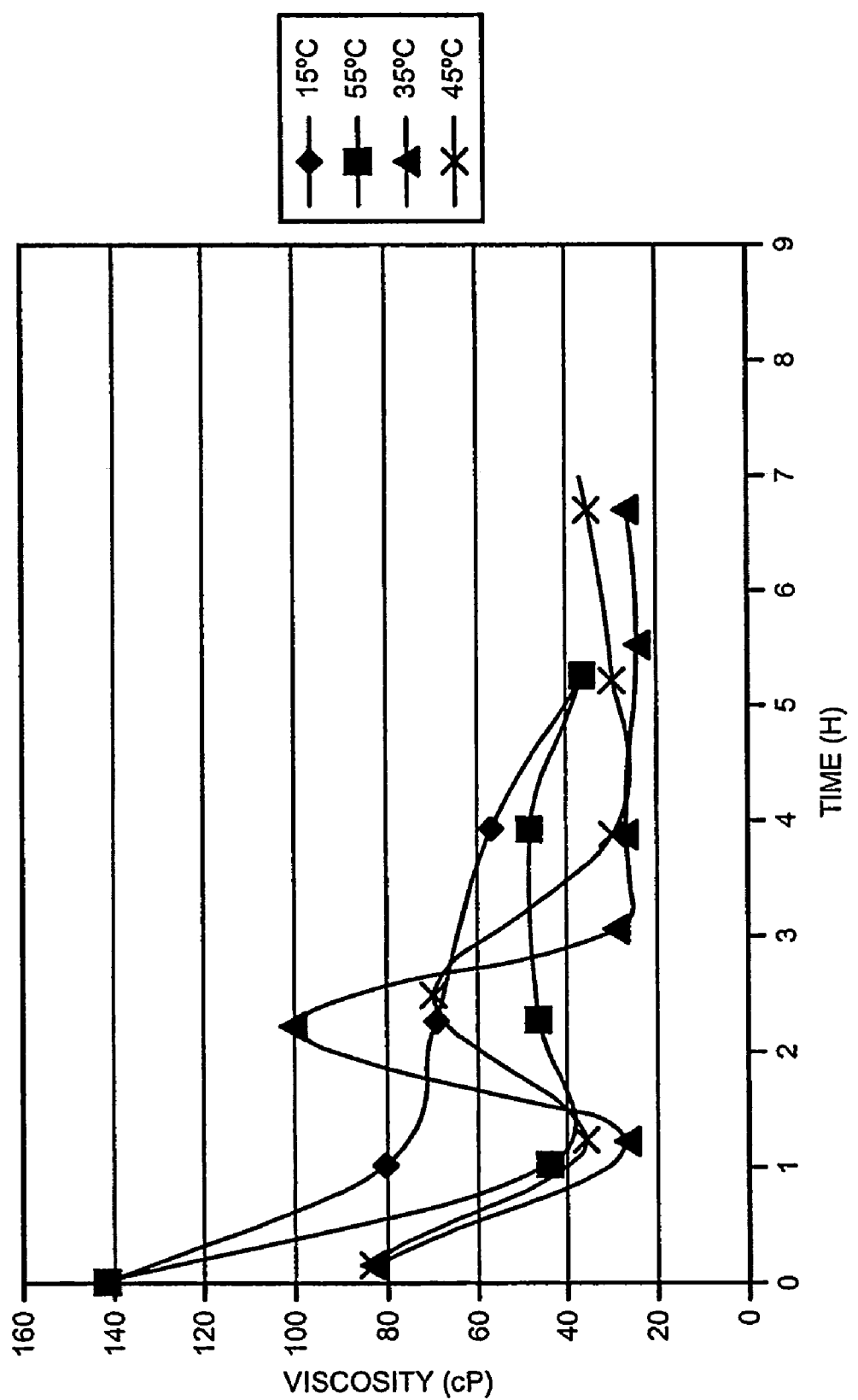

FIGS. 12 and 13 show the viscosity as a function of time for Homogenised concentrate and retentate respectively in stirred reactors.

FIGS. 12 and 13 showed that the viscosity was lower for the Homogenised concentrate than for the retentate. When stirring was applied, the viscosity of Homogenised concentrate was less than 10 cP. Homogenised retentate had a viscosity above 20 cP. As a function of time the viscosity showed minor changes after 1 h except for the 35° C. concentrate experiment where viscosity increased after 4 h.

The viscosity decreased with the temperature. Increasing dry matter will give rise in the viscosity. The viscosity as a function of temperature, pH and concentration should be controlled during processing. For example, building up viscosity desirably be avoided so that later mixing can be done (during titration).

If homogenised retentate or concentrate is stored at the laboratory bench, the viscosity increases. These slurries also develop into a gel-like substance with high viscosity. Homogenised retentate was therefore stored in reactors without aeration and stirring under controlled condition with respect to temperature. The pH was not monitored in this case.

Figure 14:
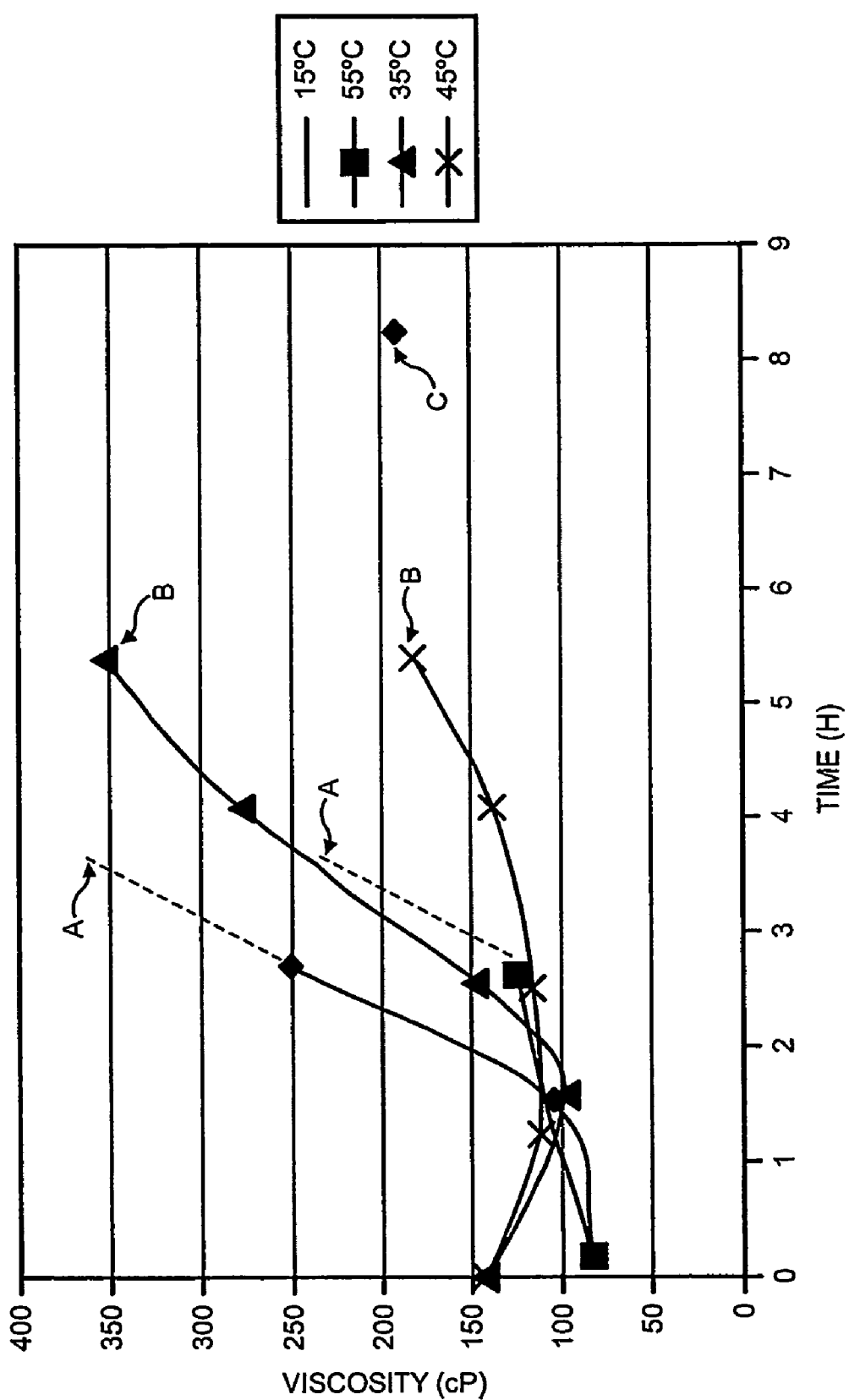

FIG. 14 shows the viscosity of Homogenised retentate as a function of time, wherein at point A the substance develops into a dough like substance with extreme viscosity, at B measurements stopped and at C the dough solubilised.

Compared to the stirred product, the viscosity increases radically without stirring. The homogenised retentate gained an increased viscosity as a function of time, and the viscosity increased more rapidly at higher temperature. The viscosity at 35° C. increased less than at 27° C., but the initial viscosity (and dry matter) of the 35° C. was lower than the 27° C.

Unstirred slurries gave voluminous dough like substance due to gas formation and aggregation. The homogenised material should therefore desirably be stirred to avoid viscosity and volume increase.

The increase in the viscosity was probably caused by aggregation of polymers and cell debris from the homogenised biomass. Aggregation gave particle sizes 10-100 μm for stored homogenised biomass, whereas a fresh homogenised slurry had particles smaller than 1.5 μm.

The conditions after homogenisation should desirably be controlled to obtain good processing conditions with respect to viscosity.

Without titration the pH will reduce. The pH reduction rate increased with temperature (15-45° C.), and the pH probably reflected both peptide degradation and acid formation from sugar conversion. At 15° C. the pH of homogenised biomass was stable for 5-9 hours and indicated low reaction rate, whereas 45° C. gave a sudden reduction from pH 6.2 to pH 5.2. In all experiments, the pH stabilised at 5-5.5.

The invention claimed is:

1. A process for producing a feedstuff or feedstuff component, comprising homogenizing a microbial culture which comprises a methanotrophic bacterium and a heterotrophic bacterium, autolyzing the resulting culture at a pH range of from 7.0 to 8.0, and separating the autolysed product from the microbial culture, wherein said product comprises about 50 to 60% by weight of free amino acids.

2. The process as claimed in claim 1, wherein said culture has been produced using methane as the carbon source.

3. The process as claimed in claim 1, wherein said culture comprises *Methylococcus capsulatus*.

4. The process as claimed in claim 1, wherein autolysis is effected at a temperature of at least 25° C.

5. An autolysed product suitable for use as a palatability enhancing agent obtainable by a process comprising homogenizing a microbial culture which comprises a methanotrophic bacterium and a heterotrophic bacterium, autolyzing the resulting culture at a pH range of from 7.0 to 8.0, and separating the autolysed product from the microbial culture, wherein said product comprises 50 to 60% by weight of free amino acids.

6. A food product comprising an autolysed material or processed derivative thereof as claimed in claim 5.

7. The food product as claimed in claim 6, wherein said food product is a dog food or an additive thereof.

8. The food product as claimed in claim 6, wherein said food product is a fish food.

9. The food product as claimed in claim 8, wherein said food product is an extruded fish food in pellet form.

10. The autolysed product as claimed in claim 5, wherein said culture has been produced using methane as the carbon source.

11. The autolysed product as claimed in claim 5, wherein said culture comprises *Methylococcus capsulatus*.

12. The autolysed product as claimed in claim 5, wherein autolysis is effected at a temperature of at least 25° C.

13. The autolysed product as claimed in claim 5, wherein said microbial culture is in the form of an aqueous slurry.

14. The process as claimed in claim 1, wherein said microbial culture is in the form of an aqueous slurry.

15. An autolysed product suitable for use as a palatability enhancing agent obtainable by a process consisting essentially of homogenizing a microbial culture which comprises a methanotrophic bacterium and a heterotrophic bacterium, autolyzing the resulting culture at a pH range of from 7.0 to 8.0, and separating the autolysed product from the microbial culture, wherein said product comprises 50 to 60% by weight of free amino acids.

* * * * *